(12) United States Patent
Candelaria et al.

(10) Patent No.: US 8,346,978 B1
(45) Date of Patent: Jan. 1, 2013

(54) FACILITATING TRANSPORT MODE INPUT/OUTPUT OPERATIONS BETWEEN A CHANNEL SUBSYSTEM AND INPUT/OUTPUT DEVICES

(75) Inventors: Susan K. Candelaria, Tucson, AZ (US); Scott M. Carlson, Tucson, AZ (US); John R. Flanagan, Poughkeepsie, NY (US); Roger G. Hathorn, Tucson, AZ (US); Matthew J. Kalos, Tucson, AZ (US); Louis W. Ricci, Hyde Park, NY (US); Dale F. Riedy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/173,733

(22) Filed: Jun. 30, 2011

(51) Int. Cl.
 *G06F 3/00* (2006.01)
 *G06F 3/01* (2006.01)
(52) U.S. Cl. .................................. 710/5; 710/6
(58) Field of Classification Search ............ 710/5, 6
 See application file for complete search history.

(56) References Cited

U.S. PATENT DOCUMENTS

| 3,693,161 | A | 9/1972 | Price et al. |
| 3,943,283 | A | 3/1976 | Caragliano et al. |
| 4,004,277 | A | 1/1977 | Gavril |
| 4,080,649 | A | 3/1978 | Calle et al. |
| 4,207,609 | A | 6/1980 | Luiz et al. |
| 4,374,415 | A | 2/1983 | Cormier et al. |
| 4,380,046 | A | 4/1983 | Frosch et al. |
| 4,414,644 | A | 11/1983 | Tayler |
| 4,455,605 | A | 6/1984 | Cormier et al. |
| 4,497,022 | A | 1/1985 | Cormier et al. |
| 4,564,903 | A | 1/1986 | Guyette et al. |
| 4,760,518 | A | 7/1988 | Potash et al. |
| 4,779,188 | A | 10/1988 | Gum et al. |
| 4,837,677 | A | 6/1989 | Burrus, Jr. et al. |

(Continued)

FOREIGN PATENT DOCUMENTS

DE 3931514 3/1990

(Continued)

OTHER PUBLICATIONS

U.S. Appl. No. 12/030,912 Non Final Office Action Mailed Aug. 18, 2011.

(Continued)

*Primary Examiner* — Hyun Nam
(74) *Attorney, Agent, or Firm* — Cantor Colburn LLP; Steven Chiu

(57) ABSTRACT

A computer program product is configured for performing a method including: receiving at least one command message specifying an I/O operation at a control unit from a channel subsystem, the at least one command message including one or more device command words (DCWs) having a data count and a suppress-length indication (SLI), the SLI configured to instruct the control unit whether to continue to perform the I/O operation in response to the control unit detecting an incorrect length condition; processing at least one of the one or more DCWs; and returning a transport response message including an incorrect length (IL) value, the IL value being a first IL value in response to the SLI being a first SLI value and the data count not matching the amount of data required, the IL value being a second IL value in response to the SLI being a second SLI value and the data count not matching the amount of data required.

27 Claims, 20 Drawing Sheets

| Name | Code | | DCW Flags | |
|---|---|---|---|---|
| Write | m m m m | m m 0 1 | CC | SLI |
| Read | m m m m | m m 1 0 | CC | SLI |
| Control | m m m m | m m 1 1 | CC | SLI |
| Sense | m m m m | 0 1 0 0 | CC | SLI |
| Sense ID | 1 1 1 0 | 0 1 0 0 | CC | SLI |
| Interrogate | 0 1 0 0 | 0 0 0 0 | CC | SLI' |
| Transfer COB | 0 1 1 0 | 0 0 0 0 | CC | SLI' |
| Transfer TCAX | p p p p p p p p | | CC | SLI' |

Explanation:

CC  Chain command
m   Modifier bit
SLI Suppress-length indication
1   Incorrect-length condition not recognized for this command; the SLI flag is ignored

U.S. PATENT DOCUMENTS

| | | |
|---|---|---|
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,325,492 A | 6/1994 | Bonevento et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,787,071 A | 7/1998 | Basso et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 625,399 A | 9/2000 | Hamilton |
| 6,125,411 A | 9/2000 | Sato |
| 6,195,330 B1 | 2/2001 | Sawey et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,401,223 B1 | 6/2002 | DePenning |
| 6,460,087 B1 | 10/2002 | Saito et al. |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,950,888 B1 | 9/2005 | Rooney et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,277,387 B2 | 10/2007 | Sanders et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 7,937,504 B2 | 5/2011 | Flanagan et al. |
| 7,941,570 B2 | 5/2011 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178421 A1 | 11/2002 | Austen et al. |
| 2003/0002492 A1* | 1/2003 | Gallagher et al. ............ 370/360 |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |

| | | |
|---|---|---|
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada et al. |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendy et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0030919 A1* | 2/2010 | Flanagan et al. .......... 710/5 |
| 2010/0030920 A1* | 2/2010 | Casper et al. .......... 710/5 |
| 2010/0064072 A1 | 3/2010 | Tang et al. |

FOREIGN PATENT DOCUMENTS

| | | |
|---|---|---|
| GB | 1264096 | 2/1972 |
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

U.S. Appl. No. 12/031,182 Final Office Action dated Oct. 20, 2011.

U.S. Appl. No. 12/030,925, Notice of Allowance Mailed Feb. 14, 2008.

U.S. Appl. No. 13/075,993 Non Final Office Action Mailed Aug. 31, 2011.

U.S. Appl. No. 12/030,932, Notice of Allowance mailed Nov. 1, 2011.

U.S. Appl. No. 12/030,981 Non Final Office Action Mailed Aug. 2, 2011.

U.S. Appl. No. 12/030,938, Notice of Allowance Mailed Aug. 8, 2011.

U.S. Appl. No. 12/030,989, Notice of Allowance Mailed Aug. 5, 2011.

U.S. Appl. No. 12/031,042, Non-Final Office Action Mailed Sep. 30, 2011.

Aboda et al.; Network Working Group; "Securing Block Storage Protocols Over IP"; ACM Digital Library; RFC3723; Apr. 2004.

ANSI INCITS 433-2007, Information Technology Fibre Channel Link Services (FC-LS), Jul. 2007.

Azimi et al.; "miNI: Reducing Network Interface Memory Requirements with Dynamic Handle Lookup"; ACM Digital Library; pp. 261-272; Jun. 2003.

Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.

Emulex Corporation; "Install the LP850 Host Adapter"; Google/ Emulex Corporation, LightPulse LP850 Fibre Channel PCI Host Adapter Manuals; pp. 1-10, 1999.

Fibre Channel Single Byte Command Code Sets-2 Mapping Protocol (FC-SB-3), T11/Project 1357-D/Rev 1.6, INCITS Mar. 2003.

Foong et al.; "Towards SSD-Ready Enterprise Platforms"; Google/ Intel Corporation; 2008-2009.

U.S. Appl. No. 12/030,920 Non-Final Office Action dated Feb. 23, 2010.

U.S. Appl. No. 12/030,951 Non-Final Office Action dated May 20, 2010.

U.S. Appl. No. 12/181,662—Non-Final Office Action dated Jun. 18, 2009.

U.S. Appl. No. 12/031,038, Notice of Allowance Mailed Oct. 6, 2010.

U.S. Appl. No. 12/031,182 Final Office Action Mailed Jul. 22, 2010.

U.S. Appl. No. 12/030,920 Notice of Allowance Mailed Aug. 23, 2010.

U.S. Appl. No. 12/030,954 Non-Final Office Action dated Jan. 21, 2010.

U.S. Appl. No. 12/030,975. Final Office Action Mailed May 13, 2010.

U.S. Appl. No. 12/030,932, Final Office Action Mailed Jul. 23, 2010.

U.S. Appl. No. 12/030,932, Non-Final Office Action Mailed Dec. 16, 2010.

U.S. Appl. No. 12/030,951, Final Office Action Mailed Oct. 26, 2010.

U.S. Appl. No. 12/030,951, Notice of Allowance Mailed Apr. 4, 2011.

U.S. Appl. No. 12/031,201 Final Office Action dated Jun. 13, 2011.

U.S. Appl. No. 12/031,201, Final Office Action Mailed Aug. 3, 2010.

U.S. Appl. No. 12/303,985, Non Final Office Action Mailed May 5, 2010.

U.S. Appl. No. 12/031,042, Final Office Action Mailed Oct. 25, 2010.

U.S. Appl. No. 12/031,042, Non-Final Office Action Mailed Apr. 5, 2010.

U.S. Appl. No. 12/364,615, Notice of Allowance Mailed Mar. 10, 2011.

U.S. Appl. No. 12/183,315 Notice of Allowance Mailed Sep. 15, 2010.

IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
Z/Series Input/Output Configuration Program user•s Guide for IYP IOCP, SB10-7029-03c. International Business Machines Corporation, Jun. 2003.
International Search Report and Written Opinion for PCT/EP2009/051447 dated Jul. 1, 2009.
International Search Report and Written Opinion for PCT/EP2009/051483 dated Jul. 27, 2009.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen et al.; "DIF/DIX Aware Linux SCSI HBA Interface"; Google; Oracle Linux Engineering; Jul. 2008.
U.S. Appl. No. 12/031,182 Non-Final Office Action dated Jan. 22, 2010.
U.S. Appl. No. 12/183,315, Notice of Allowance Mailed on Jun. 15, 2010.
U.S. Appl. No. 12/030,967 Restriction Requirement Mailed Dec. 29, 2009.
Satran et al.; Network Working Group; "Internet Small Computer Systems Interface (iSCSI)"; ACM Digital Library; RFC3720; Apr. 2004.
SCSI Primary Commands—4 (SPC-4); Project T10/1731-D. Rev 11. INCITS Apr. 14, 2010.
U.S. Appl. No. 12/183,323, filed Jul. 31, 2008.
U.S. Appl. No. 12/183,305, filed Jul. 31, 2008.
Vaghani, SB.; "Virtual Machine File System"; VMWare Inc./ACM Digital Library; pp. 57-69; 2008-2009.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
Dauby et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
U.S. Appl. No. 12/031,038 Non-Final Office Action dated Nov. 16, 2009.
U.S. Appl. No. 12/030,912 Non-Final Office Action dated Mar. 18, 2010.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Final Office Action dated Jan. 4, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,975, Notice of Allowance Mailed Oct. 19, 2010.
U.S. Appl. No. 12/030,967, Notice of Allowance mailed Apr. 23, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
Iren et al.; "The Transport Layer: Tutorial and Survey"; ACM Computing Surveys; vol. 31, No. 4; Dec. 1999; pp. 360-405.
Ichikawa et al. "Bi-Directional OFDM Transmission using Adaptive Modulation that spreads Data Symbols". Power Line Communications and its Applications, 2006, IEEE International Symposium on, vol., No., pp. 202-207.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Nordstrom.; "Sequence Reception Method for a Fibre Channel Protocol Chip"; IBM Technical Disclosure Bulletin; vol. 38, No. 12; Dec. 1995; pp. 267-269.
Peterson; "Information Techonology, Fibre Channel Protocol for SCSI, Fourth Version (FCP-3)", Draft Proposed American National Standard, Jun. 2004; pp. 1-142.
U.S. Appl. No. 12/031,201 Non-Final Office Action dated Jan. 25, 2010.
International Search Report; International Application No. PCT/EP2009/059184; International Filing Date: Jul. 16, 2009; Date of mailing: Jan. 14, 2010; 9 pages.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Sachs, M.W.; "I/O Marker Changing"; IBM Technical Disclosure Bulletin; vol. 37, No. 02A; Feb. 1994; pp. 75-76.
Simmons et al.; "A Performance Comparison of Three Supercomputers: Fujitsu VP-2600, NEC SX-3, and Cray Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. i-575.

Snively et al.; Fibre Channel Single Byte Command Code Sets-3 Mapping Protocol (FC-SB-3); T11/Project 1357- D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./ Mar. 2007; pp. 103-118.
Stone et al.; "When the CRC and TCP Checksum Disagree"; SIGCOMM '00, Stockholm, Sweden; Jul. 2000; 10 pages.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,315, filed Jul. 31, 2008.
Behrs, JR, "Adaptive Prediction Minimizes Data Overrun and Underrun", IBM, Nov. 1994, pp. 1-3. http://priorartdatabase.com/IPCOM/000114189.
"Information Technology-Fibre Channel Protocol for SCSI, Third Version (FCP-3)," T10 Project 1560-D, Revision 4g, Sep. 13, 2005.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/031,038, Non-Final Office Action Mailed Apr. 15, 2010.
Final Office Action for U.S. Appl. No. 12/030,912 mailed Oct. 6, 2010.
U.S. Appl. No. 12/031,182, Non Final Office Action Mailed Dec. 23, 2010.
U.S Appl. No. 12/031,023, Final Office Action Mailed Nov. 18, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/031,021, Notice of Allowance Mailed Apr. 30, 2010.
U.S. Appl. No. 12/946,514, Non-Final Office Action Mailed Jun. 23, 2011.
U.S. Appl. No. 12/183,323, Non-Final Office Action Mailed Jan. 3, 2011.
U.S. Appl. No. 12/183,323, Notice of Allowance Mailed Jun. 23, 2011.
IBM, "Method and Apparatus to Monitor PAV Utilization", Feb. 2005, pp. 1-3. http://priorartdatabase.com/IPCOM/000082878.
Written Opinion and International Search Report for PCT/EP2009/051461 dated Sep. 22, 2009.
Jiang, J.-et al.; "The Role of FCoE in I/O Consolidation"; ACM Digital Library/International Conf on Advanced Infocomm Technology '08; Jul. 2008.
Moore et al., "Reconfiguration of Storage Elements to Improve Performance", IBM, Dec. 1983, pp. 1-3. http://priorartdatabas.com/IPCOM/000047719.
Patent No. 7,000,036 Notice of Allowance dated Feb. 3, 2006.
Patent No. 7,000,036 Non-Final Office Action dated Jul. 15, 2005.
Patent No. 7,174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action Jun. 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965,866 Non-Final Office Action dated Jun. 3, 2010.
Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/030,989 Final Office Action dated May 24, 2010.
Laudon et al. •System Overview of the SGI Origin 200/2000 Product Line, 1997, iEEE Publication pp. 150-156.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Z/Architecture • Principles of Operation SA 22-7832-01 International Business Machines Corporation, 2nd Edition, Oct. 2001.
"z/Architecture-Principles of Operation," IBM Publication No. SA22-7832-04, 5th Ed., Sep. 2005.
URL, http://en.wikipedia.org/wiki/FICON, FICON, Wikipedia, USA, Wikimedia Foundation, Inc., Aug. 9, 2011.
U.S. Appl. No. 13/024,468, Non Final Office Action Mailed Jan. 26, 2012.
U.S. Appl. No. 13/075,993, Final Office Action Mailed Feb. 13, 2012.
U.S. Appl. No. 12/031,023, Non-Final Office Action Mailed Feb. 1, 2012.
U.S. Appl. No. 12/030,993 Notice of Allowance Mailed Dec. 22, 2011.
U.S. Appl. No. 13/150,583, Non-Final Office Action Mailed Feb. 3, 2012.
U.S. Appl. No. 13/173,772 Non Final Office Action Mailed Feb. 3, 2012.
B.A. Carlson et al, "Improved Channel Program Structure", IBM Technical Disclosure Bulletin vol. 39, No. 8, Aug. 1996, pp. 133-135, pp.
z/Architecture Principles of Operation, SA22-7832-07, Feb. 2009, pp. VIII-X.1.
International Search Report and Written Opinion, PCT/EP2012/058159, date of mailing Jul. 19, 2012.

* cited by examiner

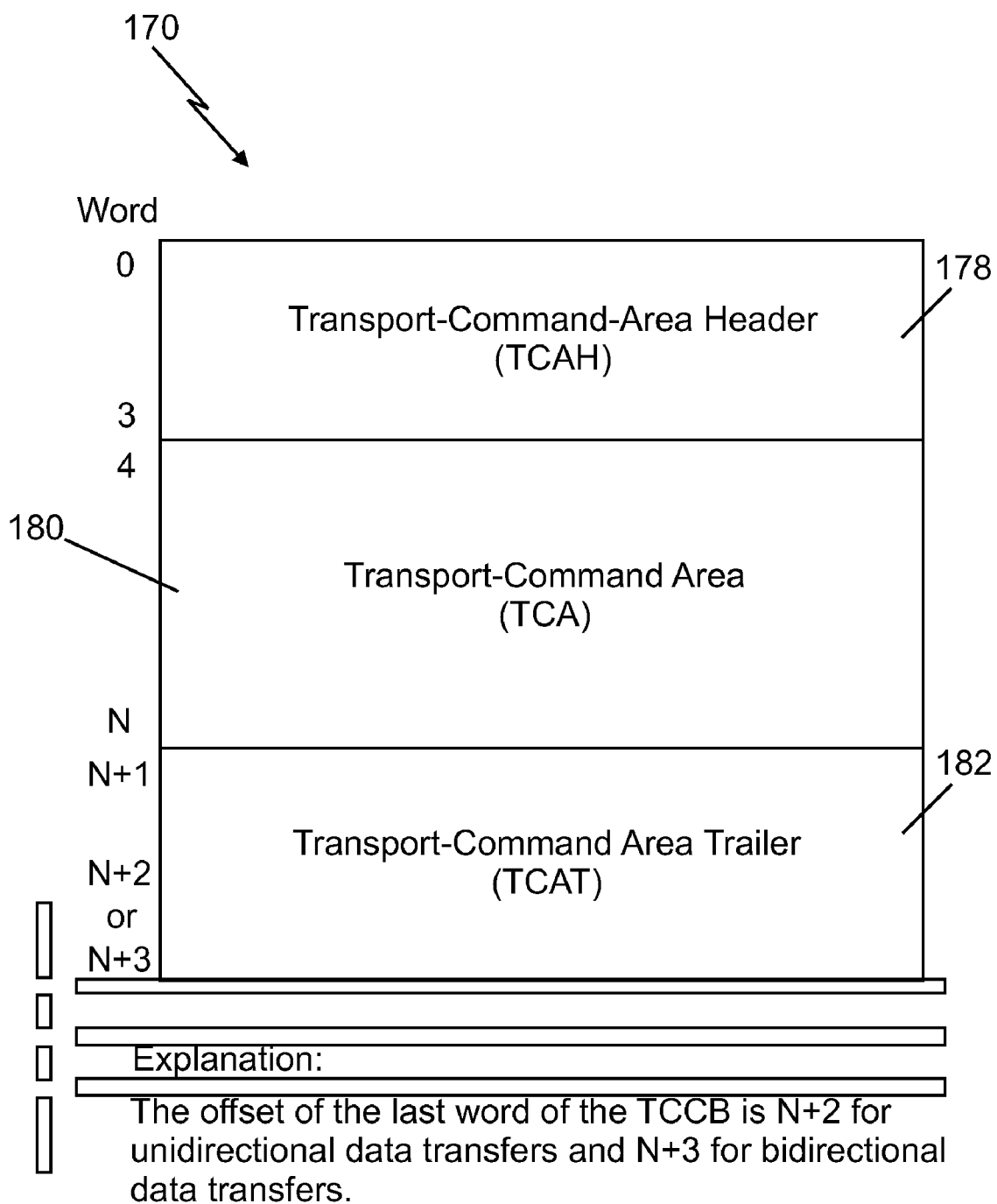

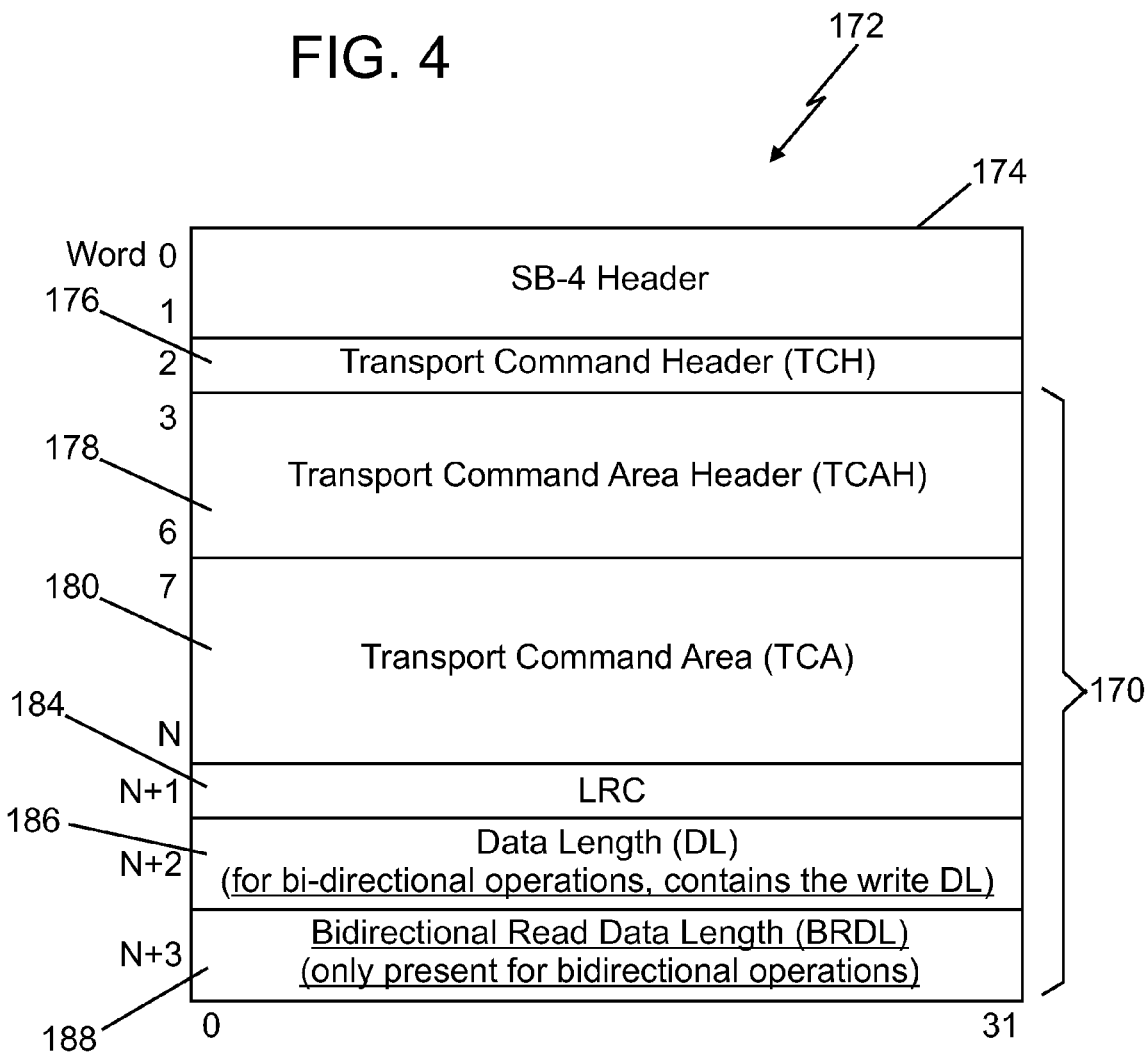
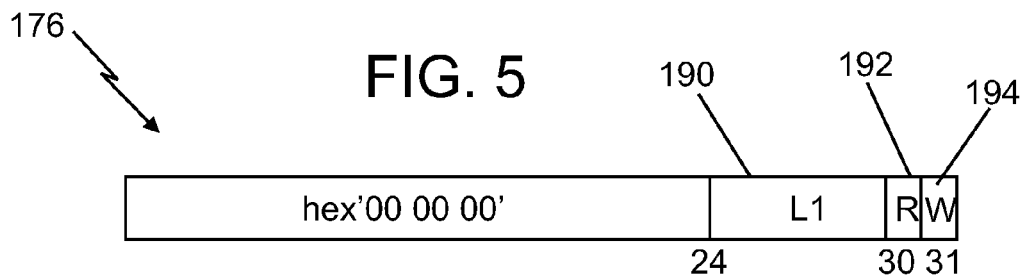

FIG. 8

| Operation | TCW Input Count | TCW Output Count | TCAT Transport Count |
|---|---|---|---|
| Input operation (TCW R-bit is 1) | Sum of DCW count values in the TCA. | n/a | Sum of DCW count values in TCA, rounded to four,2 plus four2 |
| Output operation (TCW W-bit is 1), TIDAWS not used (TCW output-TIDA flag is 0) | n/a | Sum of DCW count values in TCA | Sum of DCW count values in TCA, rounded to four,2 plus four 2 |
| Output operation (TCW W-bit is 1), TIDAWS used (TCW output-TIDA flag is 1) | n/a | Sum of DCW count values in TCA [AR ONLY: and TCAX] plus the size of the reserved areas in any specified TCMIs[3], plus total of TIDAW-specified CBC and padding bytes[1] | Sum of DCW count values in TCA [AR ONLY: and TCAX], plus the size of the reserved areas in any specified TCMIs[3], plus total of TIDAW-specified CBC and padding bytes,[1] rounded to four,2 plus four2 |

Explanation:
1  See the description at the insert-CBC control in "Flags" on page 15-114.
2  The channel subsystem adds a CBC word to the end of the last data transported. Up to 3 padding bytes are added after the last data transported to ensure the added CBC word is on a word boundary.
3  Because of alignment requirements, the size of the reserved area in a TCMI is either 0 or 4.

FIG. 9

| Operation | TCW Input Count | TCW Output Count | TCAT Read Count | TCAT Write Count |
|---|---|---|---|---|
| Input operation (TCW R-bit is 1) and output operation (TCW W-bit is 1), TIDAWS not used (TCW output-TIDA flag is 0) | Sum of read DCW count values in the TCA and TCAX. | Sum of write DCW count values in the TCA, plus count values in DCWs that specify the transfer of TCMI | Sum of read DCW count values in the TCA and TCAX, rounded to four,[2] plus four[2] | Sum of write DCW count values in the TCA, plus count values in DCWs that specify the transfer of TCMI rounded to four,[2] plus four[2] |
| Input operation (TCW R-bit is 1) and output operation (TCW W-bit is 1), TIDAWS used (TCW output-TIDA flag is 1) | Sum of read DCW count values in the TCA and TCAX. | Sum of write DCW count values in the TCA and TCAX, plus count values in DCWs that specify the transfer of TCMI, plus the size of the reserved areas in any specified TCMIs [3], plus total of TIDAW-specified CBC and padding bytes.[1] | Sum of read DCW count values in the TCA and TCAX, rounded to four,[2] plus four[2] | Sum of write DCW count values in the TCA and TCAX, plus count values in DCWs that specify the transfer of TCMI, plus the size of the reserved areas in any specified TCMIs [3], plus total of TIDAW-specified CBC and padding bytes,[1] rounded to four,[2] plus four[2] |

Explanation:
1. See the description of the insert-CBC control in "Flags" on page 15-114.
2. The channel subsystem adds a CBC word to the end of the last data transported. Up to 3 padding bytes are added after the last data transported to ensure the added CBC word is on a word boundary.
3. Because of alignment requirements, the size of the reserved area in a TCMI is either 0 or 4.

FIG. 12

| Name | Code | | DCW Flags |
|---|---|---|---|
| Write | m m m m   m m 0 1 | CC | SLI |
| Read | m m m m   m m 1 0 | CC | SLI |
| Control | m m m m   m m 1 1 | CC | SLI |
| Sense | m m m m   0 1 0 0 | CC | SLI |
| Sense ID | 1 1 1 0   0 1 0 0 | CC | SLI |
| Interrogate | 0 1 0 0   0 0 0 0 | CC | SLI' |
| Transfer COB | 0 1 1 0   0 0 0 0 | CC | SLI' |
| Transfer TCAX | 0 1 1 1 1 0 0 0 | CC | SLI' |

Explanation:

CC   Chain command
m    Modifier bit
SLI  Suppress-length indication
1    Incorrect-length condition not recognized for this command; the SLI flag is ignored

FIG. 14
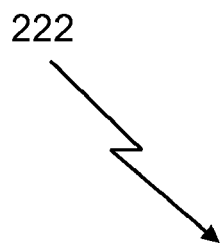
222
The COB has the following format:
4-Byte Entry
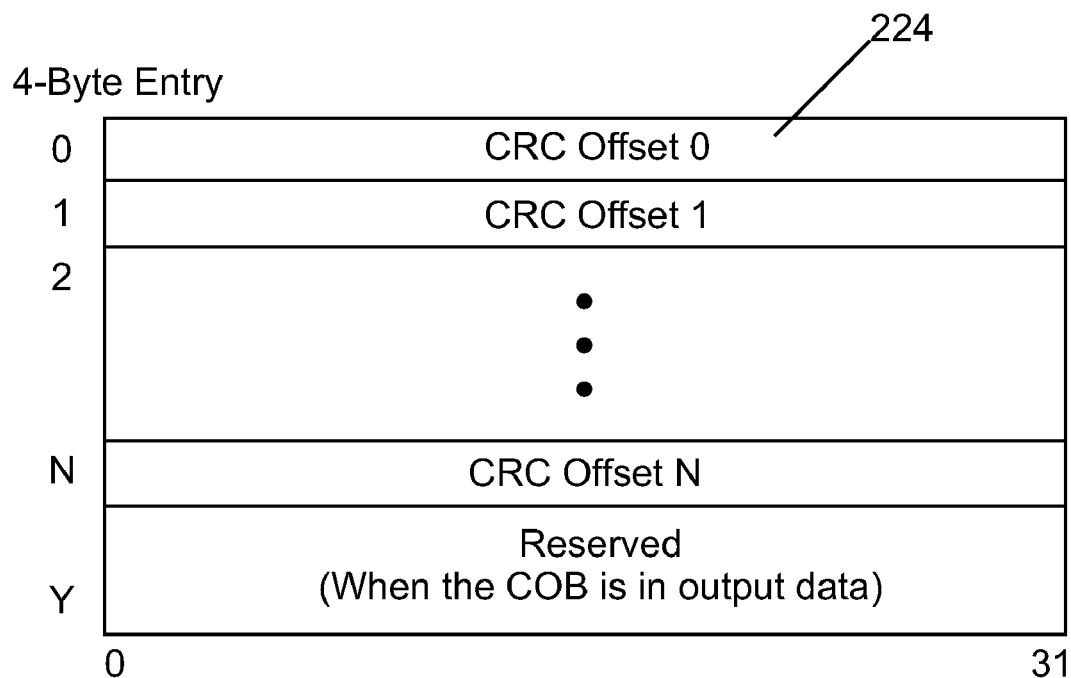
Explanation:
- The size of the COB is 4(N+1) when the COB is specified in the TCA. (There is no reserved field for this case.)
- The size of the COB is 4(Y+1) when the COB is specified in the output data, where Y is an even number that is equal to either N or N+1.

301 — Execute instruction, transfer ORB from host memory to channel subsystem, perform program check by channel subsystem 302 — Transfer a transport-command IU and TCCB from a channel subsystem to control unit 303 — Receive transport command IU and TCCB at control unit, perform error checking and accept TCCB if no errors are detected 304 — Process a TCA in the TCCB and execute DCWs by the control unit 305 — Operation ended by channel or control unit

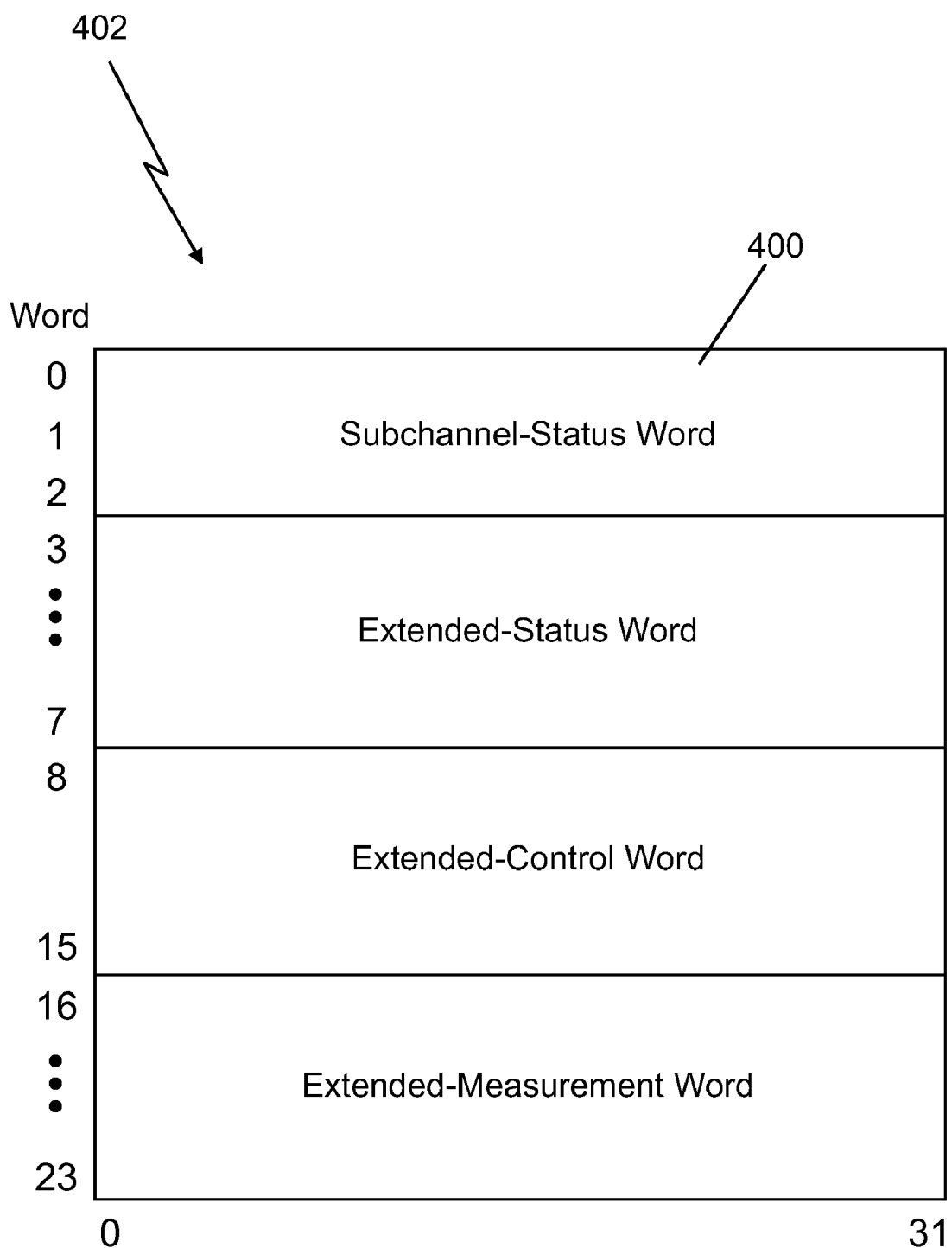

FIG. 18A

| Value | Description | IFCC | CCC | CDC | PGC | PIC | CSRF |
|---|---|---|---|---|---|---|---|
| 0 | No status available for the exception condition indicated. | X | X | X | X | X | • |
| 1 | Storage-request limit exceeded, a model-dependent number of storage requests has been exceeded for the requested block of data. | | | | X | | |
| 2 | Program check when all of the following conditions are met:<br>(1) <u>The TCW read or write data count did not go to zero and either the incorrect-length indication facility is not installed or incorrect-length indication is not supported by the device.</u><br>(2) CE only or CE and DE only status was received.<br>(3) The operation is not an interrogate, transfer-COB, or transfer-TCAX operation. | | • | • | X | • | |
| 3 | Transport mode not supported by the I/O device. | • | • | • | X | • | • |
| 4 | Transport mode not supported on the selected channel path. | • | • | • | X | • | • |
| 5 | Reserved | | | | | | |
| 6 | Program check on the TCW: An invalid TCW was detected. | • | • | • | X | • | • |
| 7 | A device-detected program check condition exists due to indeterminate cause. | • | • | • | X | • | • |
| 8 | A device-detected program check condition exists. | • | • | • | X | • | • |
| 9[5] | Program check on a TIDAW: An invalid TIDAW was detected | • | • | • | • | • | • |
| 10-31 | Reserved. | | | | | | |

FIG. 18B-1

| Value | Description | IFCC | CCC | CDC | PGC | PTC | CSRF |
|---|---|---|---|---|---|---|---|
| 32 b | TCW access exception: An exception was detected on while fetching a TCW. | • | X | • | X | X | • |
| 33 c | TSB access exception: An exception was detecting out while storing a TSB. | • | X | • | X | • | • |
| 34 d | TCCS access exception: An exception was detected while fetching a TCCS. | • | X | • | X | X | • |
| 35 e | TIDAW access exception: An exception was detected while fetching a TIDAW. | • | X | X | X | X | • |
| 36 f | Data access exception: An exception was detected while storing or fetching data. | • | • | • | • | • | • |
| 37-63 | Reserved | | | | | | |
| 64 | An invalid CBC error on read data | • | • | • | • | • | • |
| 65 | Reserved | | | | | | |
| 66 | A link protocol error condition has occurred | | | | | | |
| 67 | A failed device-level recovery operation. [AR ONLY: IFCC occurred on a Purge Path because a Purge Path function did not successfully complete] | | | | | | |
| 68 | IFCC occurred because a device-level recovery operation failed. A program, protection or data check may also be set to one in the Subchannel status. [AR ONLY: This value is set if an IFCC occurred on a Purge Path because an abort operation did not complete successfully. (See AR10161 and AR10168 for the description of the abort sequence function for transport-mode operation.)] | | | | | | |

| | | | | | | | | | | | |
|---|---|---|---|---|---|---|---|---|---|---|---|
| 69 | The residual count between the TCW and the response from the device are not the same. | X | • | • | • | • | | | | | |
| 70 | An invalid CBC was detected on the status portion of the transport response from the device. | X | • | • | • | • | | | | | |
| 71 | An invalid CBC was detected on the TSB transported from the device. | X | • | • | • | • | | | | | |
| 72-127 | Reserved | | • | • | • | • | | | | | |
| AR ONLY | | | | | | | | | | | |
| 72-95 | Reserved | | | | | | • | • | • | • | • |
| 95 | The host-bus adapter requested the same data more than once. No exchange was open or aborted. | | | | | | • | • | • | • | • |
| 97 | The host-bus adapter requested the same data more than once. The open exchange for the I/O operation was aborted. | | | | | | • | • | • | • | • |
| 98-127 | Reserved | | | | | | • | • | • | • | • |

FIG. 18B-2

| FIG. 18B-1 |
|---|
| FIG. 18B-2 |
| FIG. 18B-3 |

| Value | Description | IFCC | CCC | CDC | PGC | PTC | CSRF |
|---|---|---|---|---|---|---|---|
| | | | | | | | |

Explanation:
X   Applicable
•   Not applicable
IFCC   Interface-control check
CCC   Channel-control check
CDC   Channel-data check
PGC   Program check
PTC   Protection check
CSRF   Channel-subsystem retry failed [AR ONLY]

Footnotes:
a   The failing-storage-address (FSA) field in the ESW is valid and contains the address of the TIDAW which was determined to be invalid.
b   The FSA field is valid and contains the address of the current TCW.
c   The FSA field is valid and contains the address of the TSB designated by the current TCW
d   The FSA field is valid and contains the address of the TCCB designated (directly or indirectly) by the TCW.
e   The FSA field is valid and contains the address of the TIDAW for which the exception was detected.
f   The FSA field is valid and contains the address of the input or output data designated (directly or indirectly) by the TCW.

Note:   If the FSA field is valid for any SESQ value other than those identified by footnotes a-f, the FSA field contains the address of the current TCW.

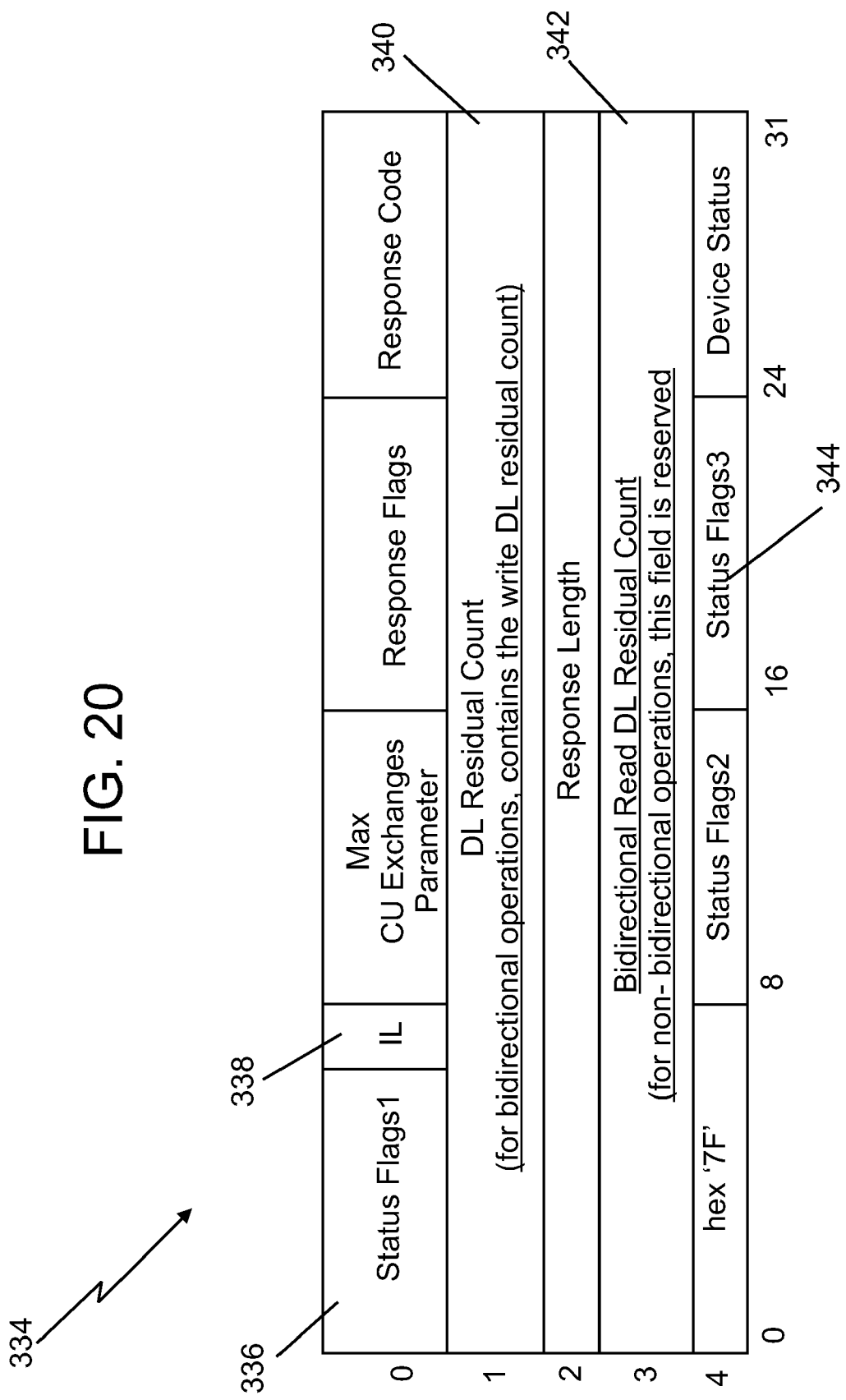

FACILITATING TRANSPORT MODE INPUT/OUTPUT OPERATIONS BETWEEN A CHANNEL SUBSYSTEM AND INPUT/OUTPUT DEVICES

BACKGROUND

The present disclosure relates generally to input/output (I/O) processing, and in particular, to providing features to facilitate transport mode I/O operations.

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem and I/O device may operate in a transport mode that supports the transfer of one or more command control blocks to transfer data between the I/O devices and memory. A transport control word (TCW) specifies one or more I/O commands to be executed. For commands initiating certain I/O operations, the TCW designates memory areas associated with the operation, the action to be taken whenever a transfer to or from the area is completed, and other options.

SUMMARY

An embodiment includes a computer program product for performing an input/output (I/O) processing operation at a control unit configured to control an I/O device and configured for communication with a host computer system, the I/O operation initiated by an I/O operation instruction. The computer program product includes a tangible storage medium readable by a processing circuit and storing instructions for execution by the processing circuit for performing a method including: receiving at least one command message specifying an I/O operation at the control unit from a channel subsystem of the host computer system, the at least one command message including one or more device command words (DCWs), each DCW associated with an I/O command, wherein at least one DCW of the one or more DCWs includes a data count and a suppress-length indication (SLI), the SLI configured to instruct the control unit whether to continue to perform the I/O operation in response to the control unit detecting an incorrect length condition, the incorrect length condition detected in response to the data count not matching an amount of data required to perform the I/O operation command, wherein the data required is one of data available at the control unit for a read operation command and data required by the control unit for a write operation command; processing at least one of the one or more DCWs; and returning a transport response message by the control unit to the channel subsystem in response to executing or terminating the I/O operation, the transport response message including a status of the I/O operation and an incorrect length (IL) value, the IL value being a first IL value in response to the SLI being a first SLI value and the data count not matching the amount of data required, the IL value being a second IL value in response to the SLI being a second SLI value and the data count not matching the amount of data required.

Another embodiment includes an apparatus for performing an input/output (I/O) processing operation at a control unit configured to control an I/O device and configured for communication with a host computer system, the I/O operation initiated by an I/O operation instruction. The control unit is configured to perform: receiving at least one command message specifying an I/O operation at the control unit from a channel subsystem of the host computer system, the at least one command message including one or more device command words (DCWs), each DCW associated with an I/O command, wherein at least one DCW of the one or more DCWs includes a data count and a suppress-length indication (SLI), the SLI configured to instruct the control unit whether to continue to perform the I/O operation in response to the control unit detecting an incorrect length condition, the incorrect length condition detected in response to the data count not matching an amount of data required to perform the I/O operation command, wherein the data required is one of data available at the control unit for a read operation command and data required by the control unit for a write operation command; processing at least one of the one or more DCWs; and returning a transport response message by the control unit to the channel subsystem in response to executing or terminating the I/O operation, the transport response message including a status of the I/O operation and an incorrect length (IL) value, the IL value being a first IL value in response to the SLI being a first SLI value and the data count not matching the amount of data required, the IL value being a second IL value in response to the SLI being a second SLI value and the data count not matching the amount of data required.

Another embodiment includes a method of performing an input/output (I/O) processing operation at a control unit configured to control an I/O device and configured for communication with a host computer system, the I/O operation initiated by an I/O operation instruction. The method includes: receiving at least one command message specifying an I/O operation at the control unit from a channel subsystem of the host computer system, the at least one command message including one or more device command words (DCWs), each DCW associated with an I/O command, wherein at least one DCW of the one or more DCWs includes a data count and a suppress-length indication (SLI), the SLI configured to instruct the control unit whether to continue to perform the I/O operation in response to the control unit detecting an incorrect length condition, the incorrect length condition detected in response to the data count not matching an amount of data required to perform the I/O operation command, wherein the data required is one of data available at the control unit for a read operation command and data required by the control unit for a write operation command; processing at least one of the one or more DCWs; and returning a transport response message by the control unit to the channel subsystem in response to executing or terminating the I/O operation, the transport response message including a status of the I/O operation and an incorrect length (IL) value, the IL value being a first IL value in response to the SLI being a first SLI value and the data count not matching the amount of data required, the IL value being a second IL value in response to the SLI being a second SLI value and the data count not matching the amount of data required.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts one embodiment of a transport command control block (TCCB);

FIG. 4 depicts one embodiment of a transport command information unit (IU) that includes the TCCB of FIG. 3;

FIG. 5 depicts one embodiment of a transport command header of the transport command IU of FIG. 4;

FIG. 8 is a table describing exemplary determinations of various data counts for uni-directional data transfer operations;

FIG. 9 is a table describing exemplary determinations of various data counts for bidirectional data transfer operations;

FIG. 12 depicts exemplary command codes and flags for DCWs;

FIG. 14 depicts one embodiment of a CBC-offset block;

FIG. 15 is a flow chart illustrating an embodiment of a method of performing a transport mode I/O operation;

FIG. 17 depicts an embodiment of an interruption-response block (IRB) including a Subchannel-Status Word (SCSW);

FIGS. 18A and 18B depict exemplary status qualifiers for the SCSW of FIG. 17;

FIG. 20 depicts one embodiment of a status area of the transport response IU of FIG. 19.

DETAILED DESCRIPTION

Figure 1:
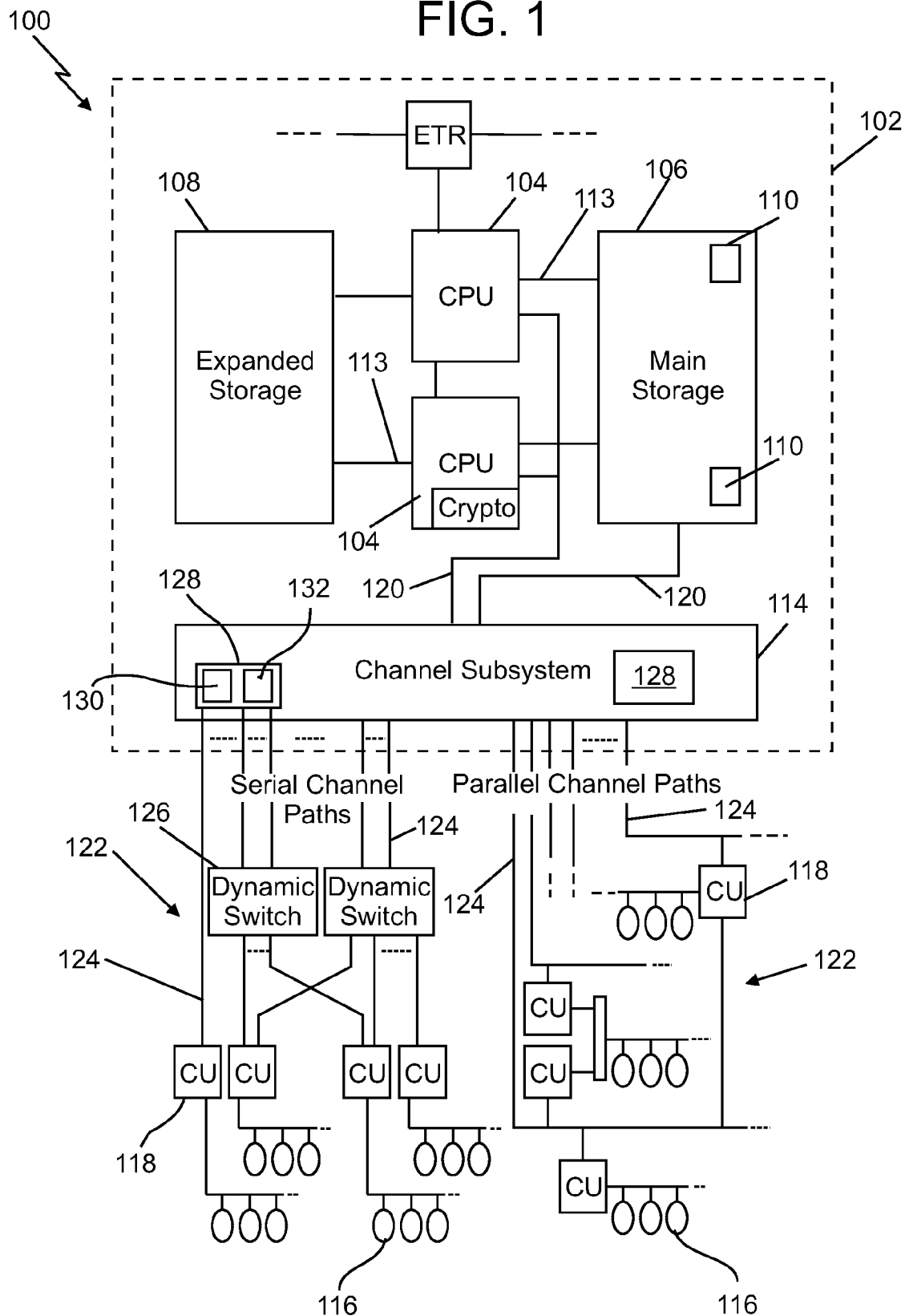
FIG. 1 depicts one embodiment of an I/O processing system incorporating and using one or more aspects of the present invention.

Embodiments of the present invention facilitate input/output (I/O) processing in a computer system. In one embodiment, transport commands are provided to manage the I/O operation and the transfer of data via a channel path. Transport commands transfer command meta-information (TCMI) that is used to manage data transfer checking and the transfer of additional DCWs. TCMI may be specified by a transport control word (TCW) is defined in one or more data transport information units (IUs) for defining, specifying and verifying information regarding data to be transferred in an I/O operation. In one embodiment, the TCMI includes control data that is included in the output data stream (e.g., in an output transport-data Information Unit) of an I/O operation. The TCMI describes how to handle this data, independent of the type of data being included. TCMI includes a data block or other container for the control data, as well as rules (e.g., for calculating counts) for specifying the metadata in the data block. Transport commands may include an interrogate command, a transfer-CBC-Offset Block (TCOB) command, and transfer-TCA Extension (TTE) command. The system also includes capability for determining and storing count values indicating the amount (e.g., number of bytes) of TCMI data to be transferred as output data.

In one embodiment, I/O processing is facilitated by enabling a host computer to increase the number of commands that can be sent to a device for an I/O operation. For example, TCMI in the form of a Transport Command Area Extension (TCAX) can be sent from the host to a device to increase the number of commands that can be associated with an I/O operation. In one embodiment, the TCAX may be specified by a TCW and is sent via a device command word (DCW), referred to as a Transfer TCA Extension (TTE) DCW, that includes commands to be performed in addition to commands sent in a Transport Command Area (TCA). In one embodiment, the TCAX is specified by the TTE DCW and is sent as output data to the control unit.

I/O processing can also be facilitated by providing a means by which an I/O device can continue an I/O operation when an incorrect length record is encountered. For example, a DCW-incorrect-length and FCX-incorrect length indication facility may be installed in the host system and a control unit or device. The facility provides for Incorrect Length (IL) checking that may be performed by a control unit. A suppress-incorrect-length or Suppress Length Indication (SLI) field may be added to a DCW sent to a device. When this bit is activated, DCW chaining is permitted to continue when an incorrect length condition is detected by the control unit.

I/O processing can also be facilitated by providing a means for sending both read and write commands to a device in a single I/O operation. Prior art TCW channel programs specify either all write commands or all read commands. A bi-directional operation can be specify by setting one or more flags in a transport command header (TCH) of a command IU, e.g., by setting both read and write flags to one and providing both a read and a write data count. In addition, a flag in an initiation or login message such as a Process Login (PRLI) request message can be set to indicate that the channel subsystem supports bidirectional data transfer. A response message such as a PRLI accept message can include a flag that can be set to indicate whether the device supports bi-directional data transfer. If bi-directional data transfer is supported by both the host and the control unit, the device will not report an error if both read and write flags are set in the command IU. This capability is an improvement over prior art Fibre Channel protocols, which do not support bi-directional data transfer operations. As described herein, "bi-directional data transfers" are transfers of both input and output data that are performed within a single TCW I/O operation, e.g., sending and executing both read and write commands within a single TCW I/O operation.

FIG. 1 illustrates an exemplary embodiment of an I/O processing system 100 that includes a host computer system 102 that includes a data storage and/or processing system such as a zSeries® mainframe computer by International Business Machines Corporation (IBM®). IBM is a registered trademark of International Business Machines Corporation, Armonk, N.Y., USA. Other names used herein may be registered trademarks, trademarks or product names of International Business Machines Corporation or other companies. The host computer system 102 includes various processing, storage and communication elements. In one embodiment, the host computer system 102 includes one or more central processing units (CPUs) 104, memory components such as a main storage or memory 106, an expanded storage or memory 108, one or more operating systems (OSs) 110 that are executed by one or more of the CPUs 104. For example, one CPU 104 can execute a Linux® operating system 110 and/or a z/OS® operating system 110 as different virtual machine instances. CPU 104 is the controlling center of the I/O processing system 100. It contains sequencing and processing facilities for instruction execution, interruption action, timing functions, initial program loading, and other machine-related functions. CPU 104 is coupled to the main memory 106 and/or expanded memory 108 via a connection 113, such as a bidirectional or unidirectional bus.

The host computer system 102 also includes a channel subsystem 114 that provides a communication interface between the host system 101 and various I/O devices 116, which may controlled by one or more control units 118. I/O devices include equipment such as printers, magnetic-tape units, direct-access-storage devices, displays, keyboards, communications controllers, teleprocessing devices, and sensor-based equipment. In the description herein, the terms "control unit" and "device" may be used interchangeably, or a control unit may be considered to include one or more devices. The channel subsystem 114 directs the flow of information between the I/O devices 116 and the host computer system 102. It relieves the CPUs 104 of the task of communicating directly with the I/O devices 116 and permits data processing to proceed concurrently with I/O processing. The channel subsystem 114 is coupled to the CPUs 104, the main memory 106 and/or the expanded memory 108 via a connection 120, such as a bus.

In one embodiment, the channel subsystem 114 is connected to each I/O device 116 via a respective "channel path" 122 that connects the channel subsystem 114 to each control unit 118 via a connection 124 such as a serial or parallel link. Control units 118 may be attached to the channel subsystem 114 via more than one channel path 122, and an I/O device 116 may be attached to more than one control unit 118 and/or I/O device 116. In all, an individual I/O device 116 may be accessible by multiple channel paths. A channel path can use various types of connections, such as a parallel interface, a serial-I/O interface and a FICON I/O interface. For example, a serial channel path may include one or more optical fibers connected to a control unit 118 via, e.g., a dynamic switch 126 in a Fibre channel fabric, and a parallel interface may include a number of electrical or fiberoptic conductors.

In one embodiment, the channel subsystem 114 includes one or more individual channels 128 that are each connected to one or more control units 118 and/or I/O devices 116 via one or more channel paths 122. Each channel 128 includes processing electronics such as a local channel microprocessor 130 and a local channel memory 132 that is connected to and accessible by the local channel microprocessor 130. The local channel memory 132 may include information such as a channel-program designation, a channel-path identifier, a device number, a device count, status indications, as well as information on path availability and functions pending or being performed.

Also located within each channel 128 are one or more subchannels. Each subchannel is a data structure located within a channel memory 132 that provides information concerning an associated I/O device 116 and its attachment to the channel subsystem 114. The subchannel also provides information concerning I/O operations and other functions involving the associated I/O device 116. The subchannel is the means by which the channel subsystem 114 provides information about associated I/O devices 116 to the CPUs 104. In one embodiment, the number of subchannels provided by the channel subsystem is independent of the number of channel paths 122 to the associated I/O devices 116. For example, a device 116 accessible through alternate channel paths 122 still is represented by a single subchannel.

Each control unit 118 provides logic to operate and control one or more I/O devices 116 and adapts, through the use of common facilities, the characteristics of each I/O device 116 to the link interface provided by a channel 128. The common facilities provide for the execution of I/O operations, indications concerning the status of I/O devices 116 and the control unit 118, control of the timing of data transfers over a channel path 122 and certain levels of I/O device control. A control unit 118 may be housed separately, or may be physically and logically integrated with an I/O device, the channel subsystem, or a CPU.

One or more of the above components of the I/O processing system 100 are further described in "IBM® z/Architecture Principles of Operation," Publication No. SA22-7832-85, 9th Edition, August 2010, which is hereby incorporated herein by reference in its entirety.

I/O operations are described as any operation that involves the transfer of data between the host computer system 102 and I/O devices 116. As described herein, an I/O operation includes the communications between the channel subsystem 114 and a device 116 (via, in one embodiment, a control unit 118) in which a single command (e.g., a channel command word or CCW), a single command message including multiple commands (e.g., a transport command information unit or transport command control block (TCCB)), or multiple chained commands (e.g., multiple CCWs) are sent from the channel subsystem 114 to a device. The I/O operation may also include one or more response messages generated by the device 116 or an associated control unit 118 in response to receiving and/or executing the command or chained commands.

In one embodiment, I/O operations are initiated with a device 116 by the execution of I/O instructions generated by an OS 110 that designate the subchannel associated with the device 116. Such instructions are executed in the host system by a CPU 104 by sending parameters to a channel 128 or subchannel to request that the channel subsystem 114 perform various functions in an I/O operation.

For example, the CPU 104 executes a "START SUBCHANNEL" instruction by passing parameters to the target subchannel requesting that the channel subsystem 114 perform a start function with the I/O device 116 associated with the subchannel. The channel subsystem 114 performs the start function by using information at the subchannel, including the information passed during the execution of the START SUBCHANNEL instruction, to find an accessible channel path to the device 116, and to execute the I/O operation once a channel path has been selected.

When an instruction such as a START SUBCHANNEL instruction is executed by the CPU 104, a channel 128 commences performing the I/O operation. In one embodiment, the channel subsystem 114 operates under a High Performance FICON (HPF) protocol for communication between the channel subsystem 114 and the devices 116 and/or control units 118. FICON and HPF are described further in "Fibre Channel: Single-Byte Command Code Sets Mapping Protocol—4 (FC-SB-4)," T11 Project 2122-D, Revision 3.00, Sep. 22, 2009, which is hereby incorporated herein by reference in its entirety.

In one embodiment, execution of the START SUBCHANNEL instruction passes the contents of an operation request block (ORB) to the channel subsystem 114. The ORB specifies a channel program that includes an address of one or more command words (e.g., a channel command word or a transport command word described further below). There are two modes of subchannel operation. In one embodiment, the host computer system 102 operates in a command mode and specifies command word(s) in the form of a channel command word (CCW). In another embodiment, the host system operates in a transport mode and specifies command word(s) in the form of a transport command word (TCW).

A subchannel may enter transport mode when an FCX (Fibre Channel Extensions) facility is installed and the start function is set at the subchannel as the result of the execution of a START SUBCHANNEL instruction that specifies a TCW channel program. The subchannel remains in transport mode until the start function is reset at the subchannel. At all other times, the subchannel is in command mode.

In command mode, the channel executes a CCW channel program that include a single channel-command word or a sequence of channel-command words executed sequentially that control a specific sequence of channel operations. A control unit executes a CCW I/O operation by decoding, accepting, and executing CCW commands by an I/O device. One or more CCWs arranged for sequential execution form a CCW channel program and are executed as one or more I/O operations, respectively.

The fibre-channel-extensions (FCX) facility is an optional facility that provides for the formation of a transport mode channel program that is composed of a transport control word (TCW) that designates a transport-command-control block (TCCB) and a transport-status block (TSB). The TCCB includes a transport-command area (TCA) which contains a list of one or more (e.g., up to 30) I/O commands that are in the form of device-command words (DCWs). A TCW and its TCCB may specify either a read or a write operation. In one embodiment, a FCX-bidirectional-data-transfer facility may be installed in a system that supports transport mode operations, that allows the host computer system 102 to specify transfer of both input and output data in a single transport mode I/O operation if the connected device 116 and control unit 118 supports bidirectional-data transfer. When a control unit 118 recognizes bi-directional data transfers, a TCW and its TCCB may, depending on the device, specify both read and write data transfers.

In the transport mode, a single transport command word (TCW) specifies a location in memory of a TCCB (as well as a location in memory 106 or 108 of one or more data areas) that is sent in a single message instead of separate individual CCWs in the command mode. A control unit 118 executes a transport mode I/O operation by decoding, accepting, and executing a TCCB and the individual DCWs included therein. If the ORB specifies a TCW channel program, the channel subsystem 114 uses information in the designated TCW to transfer the TCCB to a control unit 118. The contents of the TCCB are ignored by the channel subsystem 114 after the TCCB is transferred to the control unit 118 and only have meaning to the control unit 118 and the associated I/O device 116.

In an exemplary embodiment, the control unit 118 generates a response message in response to executing the channel program. The control unit 118 may also generate a response message without executing the channel program under a limited number of communication scenarios, e.g., to inform the channel subsystem 114 that the channel program will not be executed. The control unit 118 may include a number of elements to support communication between the I/O communications adapter and I/O devices, as well as in support of channel program execution. For example, the control unit 118 can include control logic to parse and process messages, in addition to one or more queues, timers, and registers to facilitate communication and status monitoring.

Figure 2:
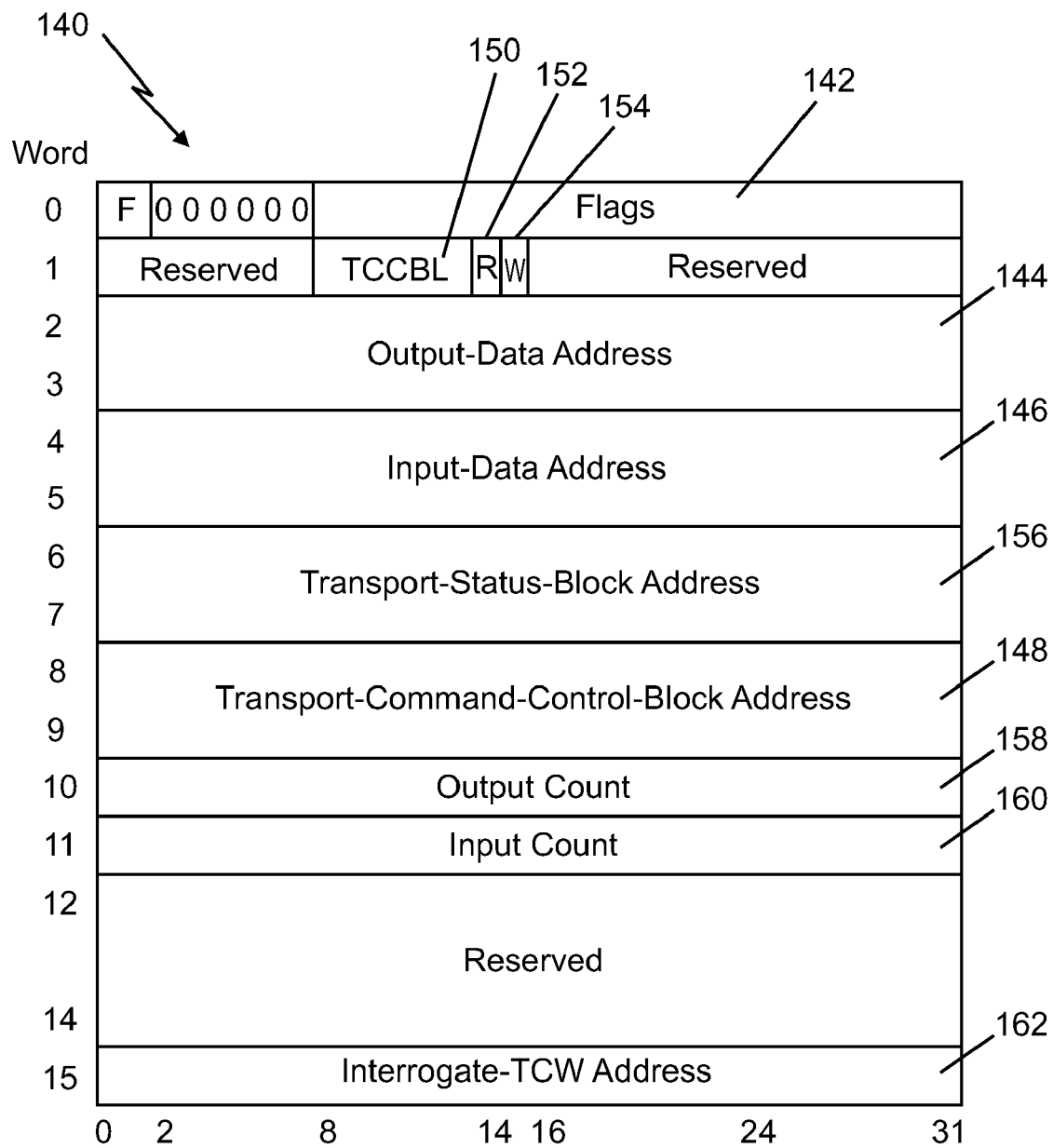
FIG. 2 depicts one embodiment of a transport control word (TCW)

FIG. 2 illustrates an embodiment of a transport-control word (TCW) 140, which is stored in the host system (e.g., main memory 106) and specifies at least one control block that is to be transferred to a control unit 118 from a channel 128. In one embodiment, the control block is a transport-command-control block (TCCB) whose contents are to be transported to the control unit 118 and I/O device 116 for processing. When the TCW 140 specifies a TCCB, the TCCB includes a TCA that specifies one or more device-command words (DCWs) and associated options. For a DCW that specifies a command which initiates the transfer of data (with the exception of control data contained within the TCCB), the TCW 140 designates one or more storage areas where the data is located.

In one embodiment, the TCA includes a Transfer TCA Extension (TTE) command that is provided to transfer additional DCWs and/or control data in addition to those that can be accommodated in the TCCB. The TTE transfers a TCA extension (TCAX) to a control unit (which includes at least one DCW) and is considered a logical extension of the TCA to which it is associated, by, for example chaining the last DCW of the TCCB to the first DCW of the TTE.

Referring again to FIG. 2, and embodiment of the TCW 140 is a 64-byte control block that is designated on a 64-byte boundary. The TCW includes various fields described below.

For example, a number of flag fields 142 indicate whether direct or indirect data addressing is being used to locate input data, output data or the TCCB. An Output transport-indirect-data addressing (TIDA) field indicates whether output data is directly or indirectly addressed. For example, when word 0, bit 7 of the TCW 140 is zero and output data is specified, an output-data-address field 144 designates an output data location in absolute storage. When bit 7 is one, the output-data-address field 144 designates an absolute address of a TIDA word (TIDAW) or the first TIDAW in a list of TIDAWS (a TIDAL) that designates the output storage location or locations, respectively. An Input TIDA field indicates whether input data is directly or indirectly addressed. For example, when word 0, bit 5 is zero and input data is specified, an input-data-address field 146 designates the absolute address of the input storage location (i.e., where input data is to be stored. When bit 5 is one, the input-data-address field 146 designates the absolute address of a TIDAW or the first TIDAW in a TIDAL that designates the input storage location or locations. A Transport-command-control-block TIDA (TCCB-TIDA) field indicates whether the TCCB is directly or indirectly addressed. For example, when word 0, bit 6 is zero, a TCCB-address field 148 designates the absolute address of the TCCB for the TCW, and when bit 6 is one, the TCCB-address field 148 designates the absolute address of a TIDAW or TIDAL that designate the location or locations of the TCCB.

The TCW 140 also includes a Transport-Command-Control-Block Length (TCCBL) field 150 that specifies the length in bytes of the TCCB. For example, the TCCBL field includes an unsigned integer whose value (e.g., when added to 20 for unidirectional data transfers or when added to 24 for bidirectional data transfers) specifies the length of the TCCB in bytes.

A Read Operations (R) field 152 is non-zero (e.g., bit 14 of word 1 is one) when indicating the number of bytes to be transferred into main memory 106. A Write Operations (W) field 154 is non-zero (e.g., bit 15 of word 1 is one) when indicating the number of bytes to be transferred from main storage. If the R-field 152 and the W-field 154 are both one, a program-check condition is recognized, unless the target device 116 and control unit 118 support bi-directional data transfer. If the W-bit is one and the TCW is an interrogate TCW, a program-check condition is recognized.

The Output-Data Address field 144 indicates the location in storage of any output data to be sent to a device. For example, when bit 15 of word 1 (the W-field bit 154) is one and bit 7 of the flags field 142 (the output-TIDA flag) is zero, words 2-3 designate the 64-bit output location in absolute storage. When the W-bit is one and the output-TIDA flag is one, words 2-3 designate the 64-bit location in absolute storage of a TIDAW or list of TIDAWs that designate the output storage location or locations. The Input-Data Address field 146 indicates the location to which any input data is to be stored when received from a device. For example, when the bit 14 of word 1 (the R-field bit 152) is one and bit 5 of the flags field 142 (the input-TIDA flag) is zero, words 4-5 designate the 64-bit input location in absolute storage. When the R-bit is one and the input-TIDA flag is one, words 4-5 designate the location in absolute storage of a TIDAW or list of TIDAWs that designate the input storage location(s).

A Transport-Status-Block Address 156 specifies a location in storage of a transport-status block for the TCW. For example, words 6-7 designate the 64-bit location in absolute storage of the transport-status block for the TCW.

A Transport-Command-Control-Block Address field 148 specifies one or more (direct or indirect) addresses of the TCCB. For example, if the TCCB-TIDA bit (bit 6 of the flags field) is zero, words 8-9 designate 64-bit location in absolute storage of the TCCB. When the TCCB-TIDA bit is zero, the TCCB is specified to reside in a contiguous area of storage. If the transport-command-control-block-TIDA bit is one, words 8-9 designate the 64-bit location in absolute storage of a TIDAW or list of TIDAWs that designate the location in absolute storage of the TCCB. When the TCCB-TIDA bit is one, the TCCB may be specified to reside in noncontiguous areas of storage The Output Count field 158 specifies the number of output bytes for the TCW. For example, when bit 15 of word 1 (the W-bit) is one, word 10 contains the unsigned integer total count of output bytes for the TCW. The Input-Count field 160 specifies the number of input bytes for the TCW. For example, when bit 14 of word 1 (the R-bit) is one, word 11 contains the unsigned integer total count of input bytes for the TCW.

If the TCW specifies an interrogation operation, an Interrogate-TCW Address field 162 indicates a location in storage of an Interrogate TCW. For example, when a START SUBCHANNEL instruction designates a TCW, word 15 of the TCW is not checked. However, when a CANCEL SUBCHANNEL instruction designates a subchannel that is start pending for a TCW channel program and is not status pending, bits 1-31 of word 15 of the TCW designated by START SUBCHANNEL specify the 31-bit location in absolute storage of the interrogate-TCW that is used to initiate an interrogate operation for the subchannel. If word 15 contains zeros when CANCEL SUBCHANNEL is issued, an interrogate operation is not initiated. When CANCEL SUBCHANNEL is issued, bit 0 of word 15 must be zero, otherwise a program-check condition is recognized with interrogate-failed status indicated. When CANCEL SUBCHANNEL is issued and bits 1-31 of word 15 do not contain zeros, bits 1-31 of word 15 must designate a storage location on a 64-byte boundary, otherwise a program-check condition is recognized with interrogate-failed status indicated. Word 14 may be reserved for extending the interrogate-TCW-address field to 64 bits.

Referring to FIGS. 3 and 4, the transport-command-control block (TCCB) 170 includes one or more individual commands as part of a TCW I/O operation, and is sent to a control unit 118 and/or device 116 by a channel 128 via a channel path. The TCCB 170 relieves the channel of having to send multiple messages or information units, and also transfers the responsibility of executing the operation to the control unit and removes the need for the control unit 118 to send responses for each command. Instead, the control unit 118 can execute all of the commands and send a response upon completion of the operation.

The TCCB 170 is variable in length, may contain header and trailer information, and one or more (e.g., from 1 to 30) commands as device-command words (DCWs) that are logically linked (e.g., chained) such that they are executed by the control unit 118 in a sequential manner. The TCCB 170 may reside as a single block of contiguous storage or may reside as multiple blocks of noncontiguous storage. For example, the TCCB-TIDA flag in the TCW 140 described above is used to specify whether the TCCB resides in contiguous storage.

Examples of a TCCB are shown in FIGS. 3 and 4. As shown in FIG. 4, the TCCB 170 may be sent from a channel 128 to a control unit 118 as part of a transport command information unit (IU) 172 that is sent to the control unit 118 to initiate an I/O operation. In one embodiment, the transport command IU 172 is made up of an 8-byte SB-4 header 174, followed by a 4-byte transport command header (TCH) 176, and the TCCB 170. The TCCB 170 includes a 16-byte transport-command-area header (TCAH) 178, a variable length transport-command area (TCA) 180, and a transport command area trailer (TCAT) 182. The TCAT 182 may further include a 4-byte LRC field 184, a 4-byte data-transfer length (DL) field 186, and for bidirectional operations, a 4-byte bidirectional read data-transfer length (BRDL) field 188. These fields are described further below.

Referring to FIG. 4, the SB-4 header 174 provides FC-4 addressing information to identify the logical path and the device 116 for the data transfer. The SB-4 header 174 provides information including a channel image ID and a control unit ID for a logical path between a channel 128 and a control unit 118, as well as a device ID.

Referring to FIG. 5, the TCH 176 includes information about the TCCB 170 and the associated device operations. In one embodiment, the TCH 176 contains 4 bytes and immediately follows the SB-4 header 174 in the transport command IU 172. The TCH 176 includes fields such as a length field ("L1") 190, a read field ("R") 192 and a write field ("W") 194. The L1 field (located at e.g., bits 24-29), specifies the length, in words, of the TCA 180 plus the 1-word LRC field 184 that directly follows the TCA 180. For example, for control units 118 that do not support bidirectional operations, the total amount of data transferred in the transport command IU 172 is equal to the L1 field plus 8 (that is, the L1 field plus the 2-word SB-4 header, the 1-word TCH, the 4-word TCAH and the 1-word DL); otherwise, the control unit recognizes a transport-command IU integrity error due to a data count error. For control units that support bidirectional operations, the total amount of data transferred in the transport-command IU 172 is equal to the L1 field plus 8 (that is, the L1 field plus the 2-word SB-4 header, the 1-word TCH, the 4-word TCAH and the 1-word DL) or the L1 field plus 9 (that is, the L1 field plus the 2-word SB-4 header, the 1-word TCH, the 4-word TCAH, the 1-word DL, and the 1-word BRDL for a bidirectional operation); otherwise, the control unit shall recognize a transport-command IU integrity error due to a data count error. If a transport-command IU integrity error is not recognized, the location of the LRC in the TCCB is located based on the L1 field and the LRC check can be performed.

The Read (R) field 192 specifies that the TCA 180 includes one or more read or input commands. In the embodiment of FIG. 5, the R field 192 is an R bit, bit 30, that indicates, when set to one, that the TCA 180 contains one or more commands that transfer read data. When the R bit is set to zero, the TCA 180 does not contain any commands that transfer read data. When the R bit is one and the W bit (e.g., bit 31) is zero, the operation is referred to as a read operation. When both the R and W bits are set to zero, the TCA 180 does not contain any commands that transfer read or write data, indicating that the I/O operation does not perform data transfer. When both the R and W bits are set to one, the TCA 180 may contain commands that transfer both read and write data, and the operation is referred to as a bidirectional operation. The device 116 or control unit 118 recognizes a TCH content error due to a read-write conflict if a bidirectional operation is specified and the control unit 118 does not support bidirectional operations, or the control unit 118 supports bidirectional operations but the transport-command IU 172 does not contain the BRDL field 188. When the R bit is zero and the control unit 118 or device 116 encounters a command in the TCA 180 that attempts to transfer read data, a TCCB content error is recognized due to an invalid read attempt.

The Write (W) field 194 specifies that the TCA 180 includes one or more write or output commands. In the embodiment of FIG. 5, the W field is a W bit, bit 31, that, when set to one, indicates the TCA 180 includes one or more commands that transfer write data. When the bit is set to zero, the TCA does not include any commands that transfer write data. When the W bit is one and the R bit (bit 30) is zero, the operation is referred to as a write operation. When the W bit is zero and the control unit 118 or device 116 encounters a command in the TCA 180 that specifies a write command, a TCCB content error is recognized due to an invalid write condition.

Figure 6:
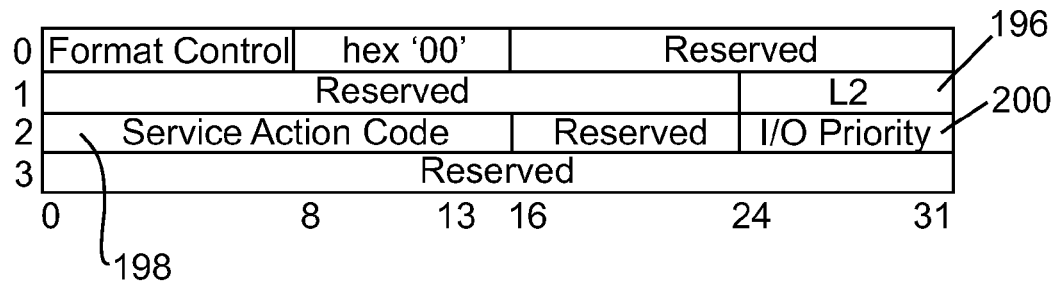
FIG. 6 depicts one embodiment of a transport command area header (TCAH) of the TCCB of FIG. 4.

Referring to FIG. 6, an embodiment of the TCA Header (TCAH) 178 includes information about the TCA 180 and the operations described therein, such as the TCA length and device indications. In this embodiment, Byte 3 of word 1 is an "L2" length field 196 that contains an unsigned binary integer that specifies the length, in bytes, of the TCA 180 plus words 2 and 3 of the TCA header, plus the 4-byte LRC field 184 that directly follows the TCA 180. A Service-Action Code field 198 (e.g., bytes 0-1 of word 2) includes an unsigned integer value that specifies the type of operation specified by the TCCB. For example, a Hex value of '1FFE' indicates a SB-4 Device I/O operation, and a Hex value of '1FFF' indicates SB-4 Device support functions. The Priority Number field 200 (e.g., byte 3 of word 2) includes the control unit I/O priority number.

Figure 7:
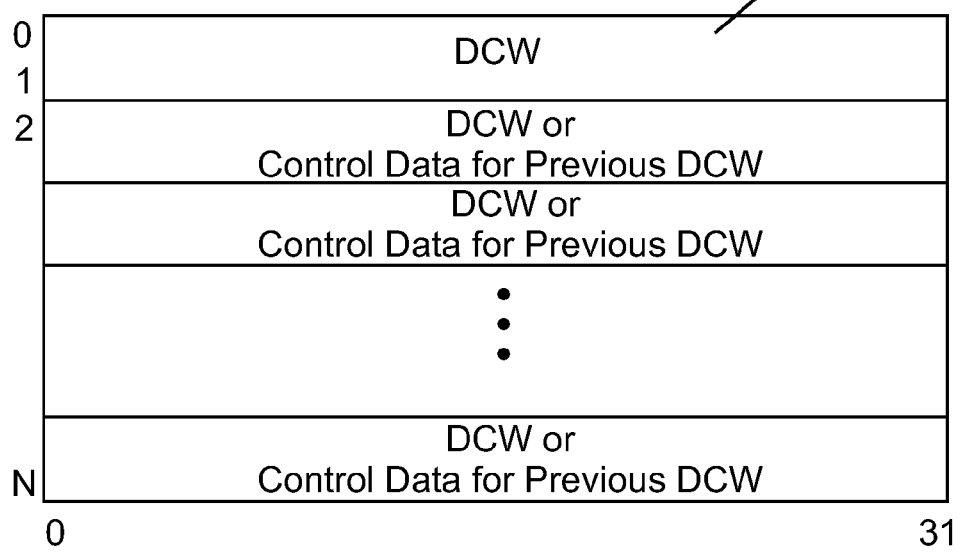
FIG. 7 depicts one embodiment of a transport command area (TCA) of the TCCB of FIG. 4.

Referring to FIG. 7, the transport-command area (TCA) 180 is a variable length area that contains one or more (e.g., from 1 to 30) commands as device-command words (DCWs) 202. The length of the TCA 180, in one embodiment, is an in integral number of 4-byte words. For DCWs 202 that specify device control data, the TCA 180 also contains the control data associated with each DCW 202. Each DCW 202 that specifies control data reduces the maximum-DCW capacity by one or more DCWs, depending on the size of the command-associated data. For DCWs 202 that specify input or output data, the TCW 140 designates the associated storage area or areas and the DCW designates the count of bytes to transfer. In one embodiment, the maximum size of the TCA is 240 bytes. As shown in the embodiment of FIG. 7, when sufficient space exists in the TCA 180 for the entire DCW 202, the DCW 202 begins on the word boundary that follows the previous DCW 202 or the control data associated with the previous DCW 202. When the last DCW 202 in the TCA 180 specifies control data that is not an integral number of words, the subsequent LRC field 184 begins on the word boundary that follows the control data.

Figure 13:
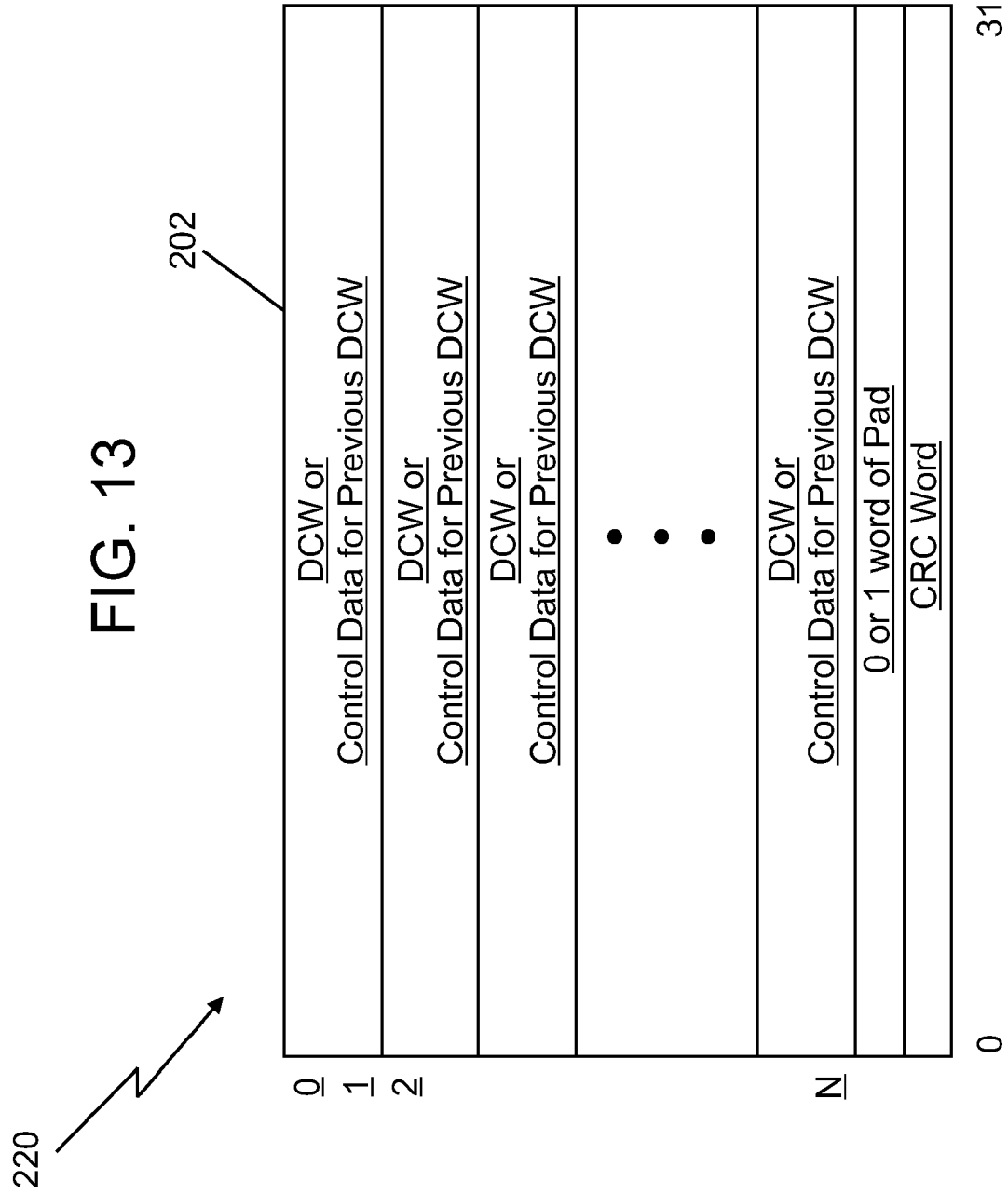
FIG. 13 depicts one embodiment of a transport command area extension (TCAX)

For some devices, the list of DCWs 202 may extend beyond what will fit in the TCA 180. In such instances, a TCA extension (TCAX) field may be specified that includes additional DCWs and transferred as if the TCAX were output data (e.g., transferred as part of an output transport-data IU). However, the TCAX is treated as a logical continuation of the TCA 180 instead of as transfer data. The TCAX is specified in the TCA 180 by a transfer-TCA-extension (TTE) DCW. The TCAX and TTE DCW are described further below, and embodiments of the TCAX are shown in FIGS. 12 and 13.

As shown in FIGS. 3 and 4, the TCCB may include a transport-command-area trailer (TCAT) 182 that provides additional information about the TCCB, including various count information. In one embodiment, when uni-directional data transfer is specified (either the R-bit or the W-bit is set to one) or no data transfer is specified (both the R-bit and W-bit in the TCW are set to zero), the TCAT 182 is two words in length. When bidirectional data transfer is specified (both the R-bit and the W-bit in the TCW are set to one), the TCAT 182 is three words in length.

For example, when uni-directional data transfer is specified, the transport count or data length (DL) field 186 specifies the 32-bit unsigned integer count of total data to be transferred (the "transport count value"). When a read operation is specified (the TCW R-bit is one), the value in the transport-count field in the TCAT may be determined by summing the count field values in the DCWs 202 that each specify a read-type command. The sum is rounded upwards to the nearest multiple of 4, and the rounded sum is increased by 4 to arrive at the transport-count value. When a read operation is specified, the transport count value should be equal to the value in the TCW input-count field 160, rounded upwards to the next multiple of 4, plus 4.

When a write operation is specified (the W-bit in the TCW is one), the count field values in the DCWs 202 that specify a write command are summed. In addition, the count field values in all transport-command DCWs (described further below) that specify the transfer of transport command-meta information (TCMI), plus the size of the reserved fields in the TCMI are added to the sum. (Note that the size of a TCMI reserved field may be zero). The total of the counts of any TIDAW-specified control block check (CBC) or cyclical redundancy check (CRC) bytes and padding bytes is added to the sum. The sum is rounded upwards to the nearest multiple of 4, and the rounded sum is increased by 4 giving the transport-count value. When a write operation is specified, the transport count value should be equal to the value in TCW output-count field 158, rounded upwards to the next multiple of 4, plus 4. When neither a read nor a write operation is specified (both the W-bit and R-bit in the TCW are zero), the transport count value should be zero.

When bidirectional data transfer is specified, the DL field 186 is the write count and specifies the 32-bit unsigned integer count of total output data to be transferred. The transport count value in the DL field (write-count field) in the TCAT 182 is determined as described above for a write operation. The bi-directional read data length (BRDL) field 188 specifies the 32-bit unsigned integer count of total input data to be transferred. The transport count value for the BDRL field 188 is determined as described above for read operations.

In one embodiment, for a write operation or bidirectional operation, the DL field shall contain a 4-byte unsigned binary integer that specifies the number of bytes to be transferred by the channel to the control unit for the operation and includes all intermediate and final pad and CRC bytes, and if a COB is included in the first transport-data IU of the write operation, it also includes the COB, any COB pad bytes and the COB CRC bytes. If a TTE DCW is present in the TCA, the DL field also includes the TCAX, any TCAX pad bytes and TCAX CRC bytes.

FIGS. 8 and 9 are tables summarizing the determination of the TCW input-count, output-count, and the TCAT transport count values for unidirectional and bi-directional transfers, respectively.

For a bidirectional operation, a bidirectional-read-data-length (BRDL) field includes a 4-byte unsigned binary integer that specifies the number of bytes to be transferred by the control unit to the channel for the operation and includes any pad bytes required to round to a word boundary if not already on a word boundary plus 4 bytes for CRC. For operations that are not bidirectional operations, the device shall recognize a TCH content error due to a read-write conflict if the transport-command IU contains the BRDL field.

Figure 10:
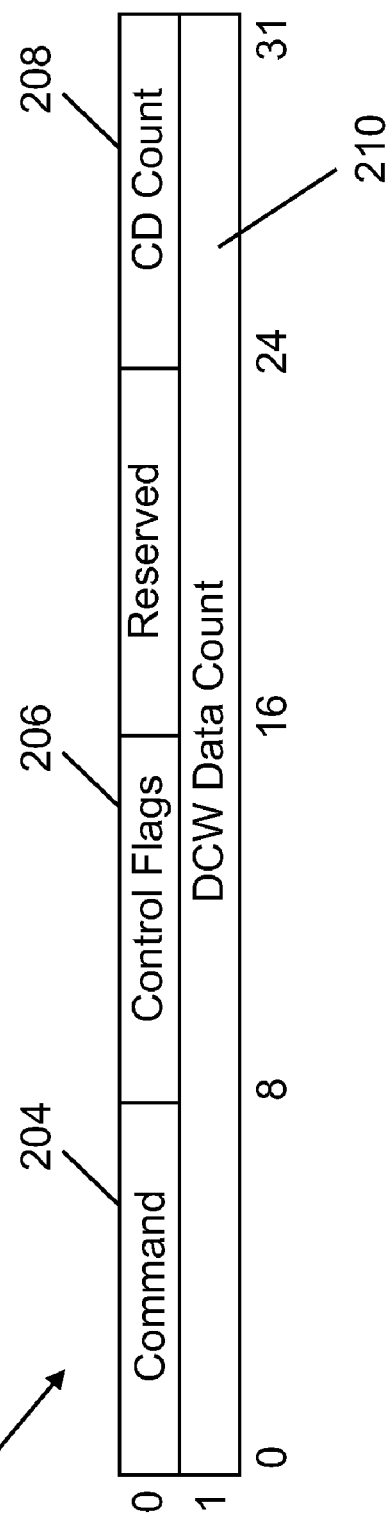
FIG. 10 depicts one embodiment of a device command word (DCW)

Referring to FIG. 10, a device-command word (DCW) 202 specifies a command to be executed. For commands initiating certain I/O operations, it designates the count of bytes on which the operation is performed, the action to be taken whenever transfer to or from storage is completed, and other options. The storage area or areas associated with a DCW data-transfer operation are designated, depending on the operation specified by the command, by the input-data-address field 146 or the output-data-address field 144 of the TCW 140 that designates the TCCB 170 that includes the DCW 202. Whether the input-data-address field 146 or the output data-address field 144 designates the storage directly or indirectly is specified by the input-TIDA and output-TIDA flags in the TCW 140.

In one embodiment, the DCW 202 is an 8-byte control block that is designated in the TCW 140 on a word boundary. The DCW 202 includes fields such as a command code field 204, a control flags field 206, a control data count 208 and a DCW data count 210.

The Command Code field 204 (e.g., bits 0-7 of word 0) specifies the operation to be performed. Whether a command is valid is device dependent and dependent on the value of the service-action code field 198 in the TCAH 178. Basic commands include read, write, control, sense and transport. The channel subsystem 114 distinguishes among the following operations: control, output forward (write), input forward (read, sense, sense ID), input backward (read backward), branching (transfer in channel) and transport. Some commands, when executed, do not result in the transfer of data but cause the device to chain and start execution of the next command when all of the conditions for command chaining are satisfied. Each of the basic operations is described below.

A read command initiates execution of a device operation that performs device-to-channel data transfer. A write command initiates execution of a device operation that performs channel-to-device data transfer. A control command initiates execution of a device operation that makes use of control data provided in the DCW. The sense command is similar to a read command, except that the data is obtained from sense indicators rather than from a record source. Control commands and associated control data are provided for management of the specific I/O device and control of the device during execution of an I/O command. A transport command is provided to manage the I/O operation and the transfer of data via a channel path, and is not device specific. Such commands manage the transport of control block checking data such as cyclical redundancy check (CRC) data and the transport of additional DCWs in transport-data IUs.

The Control-Data (CD) Count field 208 specifies the number of control data bytes associated with a DCW 202. For example, byte 3 of word 0 specifies the length of the control data, in bytes. If the command code specifies a command that requires control data and byte 3 of word 0 specifies a control-data count that is less than required for the command, a unit-check condition or TCCB content error is recognized. If the command code specifies a command that requires control data and byte 3 of word 0 contains zero or contains a value that specifies data past the end of the TCA (or past the end of the specified TCAX), a device-detected-program check condition or TCCB content error is recognized.

The DCW Data Count field 210 specifies the byte count of the data (e.g., data to be transferred for the read or write operation, i.e., customer data) designated by the TCW for the present DCW 202. For example, the DCW data count is included in word one of the DCW 202 of FIG. 10, and specifies the 32-bit unsigned integer count of bytes in the storage area designated by the TCW for this DCW. The DCW data count field 210 indicates the number of bytes to be transferred between the channel and control unit during execution of the DCW, not including any pad or CRC bytes.

Figure 11:
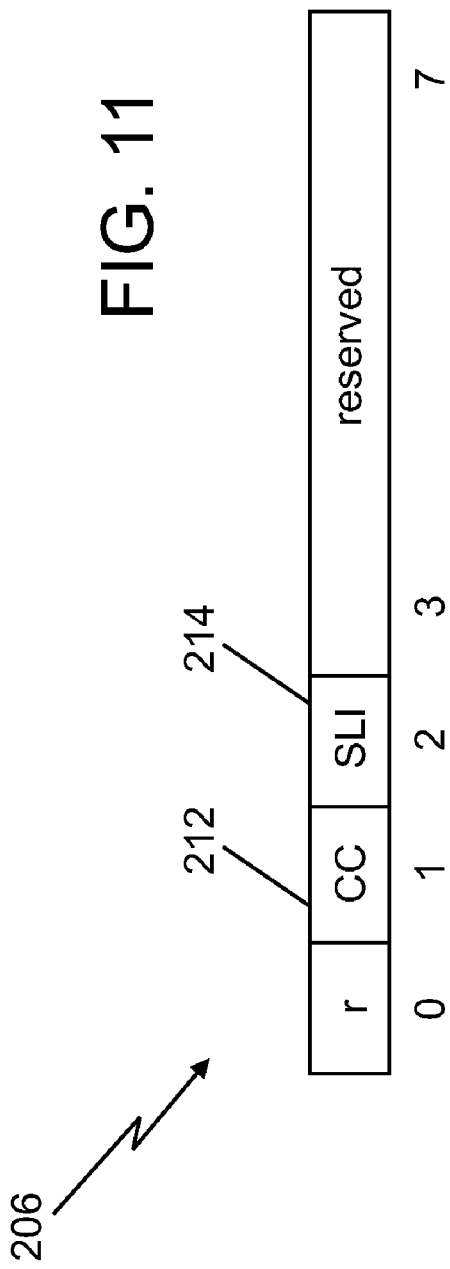
FIG. 11 depicts one embodiment of a control flags field of the DCW of FIG. 10.

Referring to FIG. 11, in one embodiment, the DCW 202 includes various control flags 206. A chain-command (CC) flag 212 specifies an intent to perform chaining of commands. Upon normal completion of the current device operation and after recognition of device end at the device, chaining of commands causes the next DCW 202 in the TCA 180 to be executed. The CC flag 212 is set to zero in the last DCW in the TCA. In the embodiment of FIG. 10, bit 9 of word 0 (the CC bit), when one, specifies the chaining of commands. When one, the bit causes the operation specified by the next DCW to be initiated upon normal completion of the current DCW. When the control-data count is zero, the next DCW immediately follows the DCW in the TCA or in a TCAX. When the control-data count is not zero, the next DCW immediately follows the control-data, rounded to a word boundary, specified for the DCW. When the chain-command flag is one, in one embodiment, the next DCW location in the TCA or in a TCAX is determined by adding eight and the value in the CD count field to the location of the current DCW and rounding upwards to the nearest word boundary. If the chain-command flag is one in a DCW in a TCA, and the next DCW location is past the end of the TCA, and a TCAX is specified, the next DCW is at the beginning of the specified TCAX.

The control flags field, in one embodiment, include a Suppress Length Indication (SLI) field 214. When the DCW-incorrect-length facility is supported by a channel 128 and a control unit 118, a bit (e.g., bit 2) is provided in the SLI flag field 214 that controls whether command chaining is to occur on an incorrect-length condition and whether incorrect length is to be indicated in a transport-response IU by the control unit when an incorrect-length condition is detected by the control unit 118. An incorrect-length condition is detected by the control unit if the DCW data count does not match the amount of data required by the device for a write DCW or if the DCW data count does not match the amount of data available at the device for a read DCW. When the DCW-incorrect-length facility is not supported by the channel and control unit, bit 2 is reserved and set to zero by the channel and ignored by the control unit.

When the SLI flag 214 is one, incorrect-length indication is suppressed. When both the CC and SLI flags are ones, command chaining takes place regardless of the presence of an incorrect-length condition. When the SLI flag 214 is one and an incorrect-length condition exists for the current DCW, command chaining, if indicated, shall be permitted and the control unit continues execution of the next following DCW. In one embodiment, The SLI flag bit should be set to one or otherwise activated in all DCWs where suppression of the incorrect-length indication is desired.

If the SLI flag is zero and an incorrect-length condition exists for a DCW, command chaining, if indicated, is not permitted and the control unit 118 aborts the I/O operation. In the channel subsystem 114, if the SLI flag is zero and an incorrect-length condition exists, processing of the TCA 180 is terminated and the subchannel is made status pending with incorrect length indicated in the subchannel status. When an incorrect-length condition exists for a DCW 202 and the SLI flag 214 in the DCW is set one, data transfer is performed as described below, otherwise the operation is terminated and an abnormal termination condition shall be reported for the operation.

For a read DCW 202, if the DCW data count is greater than the amount of data available at the device 116 for the command, then the following applies. If the CC flag 212 is one (chaining is indicated), the data available at the device 116 is transferred to the channel 128 and pad bytes (which are set to zero) are transferred so that the amount of data transferred for the DCW 202 is equal to the DCW data count. All data transferred, including pad bytes, are included in any computation of CRC required for the operation. If the CC flag 212 is zero (chaining is not indicated), the data available at the device shall be transferred to the channel and either no additional data shall be transferred or pad bytes (set to zero) are transferred so that the amount of data transferred for the DCW is equal to the DCW data count. The data transferred plus any pad bytes shall be included in the computation of CRC required for the operation. It is model dependent whether pad bytes are transferred for this case. If the DCW data count is less than the amount of data available at the device for the command, only an amount of data equal to the DCW data count is transferred to the channel 128 for the DCW 202. Only the data transferred shall be included in the computation of CRC required for the operation.

For a write DCW 202, if the DCW data count is greater than the amount of data required by the device 116 for the command, then the following applies. If the CC flag 212 is one (chaining is indicated), the amount of data specified by the DCW data count shall be transferred to the control unit 118. The data transferred shall be used in the computation of any CRC required for the operation, and data not required by the device 116 is discarded. If the CC flag is zero (chaining is not indicated), the amount of data required by the device 116 is transferred to the control unit 118. Additional data is transferred up to the next intermediate CRC word or until the data count for the DCW is exhausted. All data transferred is used in the computation of any CRC required for the operation. If the DCW data count is less than the amount of data required by the device 116 for the command, the amount of data specified by the DCW data count is transferred to the control unit 118. The data transferred is used in the computation of any CRC required for the operation.

For a write DCW 202 in which the DCW data count is greater than the amount of data required by the device 116 for the command and the CC flag 212 is zero (chaining is not indicated), the amount of data required by the device 116 is transferred. Data then continues to be transferred until the next CBC is specified to be inserted or until the total amount to be transferred is equal to the DCW data count. Exemplary command codes are shown in FIG. 12, which illustrates six TCW commands and indicates which flags are defined for each command. A transport-command DCW is a type of DCW that does not specify a specific data transfer command (i.e., customer data that is requested to be transferred by a host computer instruction), but rather specifies a transport command that performs a support function associated with a transport-mode I/O operation. A transport-command DCW may specify control data and may also specify the transfer of transport-command-meta information (TCMI). TCMI includes data that is utilized to control transfer functions in the I/O operation, such as the status of an I/O operation at a device, information regarding additional DCWs that do not fit in or can be accommodated by a current TCCB, and control block checking (CBC) information such as cyclical redundancy check (CRC) data.

When a transport-command DCW specifies the transfer of TCMI to a device, the TCMI is transferred in a data block or word as output data (e.g., in a transport-data IU). The size of the TCMI is command dependent and is, for example, a multiple of 4. The TCMI may be extended by 4 reserved bytes when the size of the TCMI is an even multiple of 4, TIDAWs are used to specify the output storage areas, the insert-CBC flag is one in the last TIDAW used to specify the storage containing the TCMI, the chain-command bit is one in the transport command DCW that specifies the TCMI, and a subsequent DCW specifies the transfer of a TCMI or output data. Note that when a transport command specifies the transfer of a TCMI to a device and the TCMI is extended by 4 reserved bytes because all of the preceding conditions are met, the 4 reserved bytes are not included in the data-count value in the transport command DCW but are included in the following: the count value in the last TIDAW used to specify the storage containing the TCMI, the output-count value in the TCW and the transport-count value in the associated TCCB (for unidirectional data transfers or the write-count value in the associated TCCB for bidirectional transfer).

For example, data counts for an output operation (the TCW write bit 154 is one and the TCW read bit 152 is zero) in which the TCW 140 does not specify indirect addressing (the TCW output TIDA field in the TCW flags field 142 is zero) are determined as follows. The TCW Output Count 158 is the sum of the DCW Data Count 210 values in each DCW 202 in the TCA 170 of the TCCB 172. The TCAT 182 Transport Count (e.g., the DL field 186) is the sum of the DCW Data Count 210 values in each DCW 202 in the TCA 170, rounded to four, plus four. In one embodiment, this count value is rounded to four to account for any padding bytes that have been added to the last DCW so that the last DCW has a 4-byte length and ends on a word boundary. The addition of four is used to account for a four-byte CBC word that is added to the end of the last DCW (e.g., LRC 184).

In another example, data counts for an output operation (the TCW write bit 154 is one and the TCW read bit 152 is zero) in which the TCW 140 does specify indirect addressing (the TCW output TIDA field in the TCW flags field 142 is one) are determined as follows. The TCW Output Count 158 is the sum of the DCW Data Count 210 values in each DCW 202 in the TCA 170 and the length of any TCMI data blocks (e.g., TCAX 220), plus the size of any TCMI reserved bytes, plus the total of any CBC words and padding bytes specified by a TIDAW. The TCMI length may be taken from the DCW count 210 values in DCWs specifying TCMI. The TCAT 182 Transport Count (e.g., the DL field 186) is the sum of the of the DCW Data Count 210 values and the length of any TCMI data blocks, plus the size of any TCMI reserved bytes and the total of any TIDAW-specified CBC words and padding bytes, rounded to four, plus four. In one embodiment, this count value is rounded to four to account for any last padding bytes and is added to four to account for last CBC, as described above.

In another example, data counts for a bi-directional operation (the TCW write bit 154 is one and the TCW read bit 152 is one) in which the TCW 140 does not specify indirect addressing (the TCW output TIDA field in the TCW flags field 142 is zero) are determined as follows. The TCW Output Count 158 is the sum of the Write DCW Data Count 210 values in each Write DCW 202 in the TCA 170 and the length of any TCMI data blocks (e.g., TCAX 220). The TCMI length may be taken from the DCW count 210 values in the DCWs specifying TCMI. The TCAT 182 Transport Count (e.g., the DL field 186) is the sum of the of the Write DCW Data Count 210 values and the length of any TCMI data blocks, rounded to four, plus four. In one embodiment, this count value is rounded to four to account for any last padding bytes and is added to four to account for last CBC, as described above.

In another example, data counts for a bi-directional operation in which the TCW 140 does specify indirect addressing are determined as follows. The TCW Output Count 158 is the sum of the Write DCW Data Count 210 values in each Write DCW 202 in the TCA 170 and the length of any TCMI data blocks (e.g., TCAX 220), plus the size of any TCMI reserved bytes, plus the total of any CBC words and padding bytes specified by a TIDAW. The TCMI length may be taken from the DCW count 210 values in DCWs specifying TCMI. The TCAT 182 Transport Count (e.g., the DL field 186) is the sum of the Write DCW Data Count 210 values and the length of any TCMI data blocks, plus the size of any TCMI reserved bytes and the total of any TIDAW-specified CBC words and padding bytes, rounded to four, plus four. In one embodiment, this count value is rounded to four to account for any last padding bytes and is added to four to account for last CBC, as described above.

In one embodiment, TCMI includes interrogate information (via an Interrogate DCW), a CBC-Offset Block (via a Transfer-CBC-Offset Block DCW) and a TCA extension (via a Transfer-TCA Extension DCW).

FIG. illustrates an embodiment of data specified by one type of transport-command DCW, referred to as a Transfer TCA Extension (TTE) command, which is included in a TCA 180 of a TCCB 170 and specifies a TCA extension (TCAX) 220 that is to be transferred to a control unit 118. The TCAX is considered a logical extension of the TCA 180. For some devices 116, the list of DCWs 202 associated with an I/O operation exceeds the number of DCWs that can be accommodated in the TCA 180. In such an instance, a TTE DCW may be included at the end of the TCW 140, which specifies a TCAX 220 that is transferred as output data (e.g., in a data-transport IU). The content of the TTE DCW may include a command code that includes the transfer-TCA extension command (e.g., value of 50 hex)

For example, a TCA 180 is variable in length with a maximum size of 240, and a DCW is 8 bytes. Thus, in this example, a maximum of 30 DCWs may be transmitted in a TCCB 170. However, for DCWs 202 that specify control commands that require control data, the control data immediately follows each DCW 202 in the TCCB. Thus, TCCBs 170 containing such commands are limited to less than 30 DCWs. The TTE DCW may be used to specify additional DCWs needed for the I/O operation that do not fit in the TCA 180.

As shown in FIG. 13, The TCA Extension (TCAX) is a variable-length area that is the logical continuation of the TCA 180 in another transport-command IU or TCCB, and includes a list of DCWs and associated control data. The TCAX contains one or more additional DCWs and associated control data for a TCW I/O operation (in addition to those transferred in an initial TCCB), and can be sent in another TCCB or in a transport-data IU to extend a list of DCWs required for an I/O operation. In one embodiment, the length of the TCAX is an integral multiple of 4.

As shown in FIG. 13, in one embodiment, the TCAX 220 includes a DCW 202 and/or control data for a previous DCW 202. When the last information in the TCAX 220 is a DCW 202, the end of that DCW 202 defines the end of the meaningful information in the TCAX 220. When the last information in the TCAX 220 is control data and the control data ends on a 4-byte boundary, the end of the control data defines the end of the meaningful information in the TCAX 220. When the last information in the TCAX 220 is control data and the control data does not end on a 4-byte boundary, padding bytes are appended to the control data to reach a 4-byte boundary and the end of the padding bytes define the end of the meaningful information in the TCAX 220. When the size of the meaningful information in the TCAX 220 divided by four is an odd number, there are no reserved bytes; otherwise, the four bytes immediately following the meaningful information in the TCAX 220 are reserved and should contain zeros. When control data for the last DCW 202 in the TCA 180 is contained in the TCAX 220, that control data is the first data in the TCAX 220. Additional DCWs and control data in the TCAX 220 are processed as defined for the TCA 180.

In one embodiment, when a TCOB DCW (described further below) is not present in the TCA 180, the TTE DCW is the first DCW 202 in the TCA 180. When a TCOB DCW is present in the TCA 180, the TTE DCW is the second DCW 202 in the TCA 180. The TTE DCW data count specifies the length of the TCAX 220 and may be an integral multiple of four bytes. The TTE DCW control-data count is zero and the chain command flag in the TTE DCW is set to one. The TTE DCW data does not include the TCAX CRC or TCAX pad bytes.

A TTE command (TTE DCW) should be sent to a device that indicates support for the TTE command and is sent when the TCA length has a certain maximum (e.g., 60 words) and the control data for the last DCW in the TCA extends beyond the last byte in the TCA, or the TCA length is greater than, e.g., 58 words, and one or more additional DCWs are required for the I/O operation. When a COB is provided in the write transport-data IU, the TCAX shall follow the COB CRC. When a COB is not provided, the TCAX shall be sent in the first write transport-data IU of the I/O operation.

Another type of DCW is a Transfer CBC-Offset Block (TCOB) DCW, which is a command that transfers a CBC Offset Block (COB) to a control unit. CBC data refers to control block checking data that is used to verify that the correct amount of input or output data is being transferred in an I/O operation. In one embodiment, the CBC data is cyclical redundancy check (CRC) data, the COB is a CRC Offset Block, and the TCOB DCW is a Transfer CRC-Offset Block DCW. Generally, a cyclic redundancy check (CRC) is an error-detecting code configured to detect accidental changes to raw data being sent between a channel 128 and a control unit 118. A CRC-enabled device (e.g., the channel 128) calculates a short, fixed-length binary sequence for each block of data to be sent or stored and appends it to the data, forming a codeword or "CRC word". For example, when CRC generation is provided, the channel 128 generates a CRC on the data sent and inserts the value calculated at the end of the last data byte. When a CRC word is received or read, the receiving device (e.g., the control unit 118) either compares its check value with one freshly calculated from the data block, or equivalently, performs a CRC on the whole codeword and compares the resulting check value with an expected residue constant. If the check values do not match, then the block contains an error in the transferred data. Although the CBC data is described in the embodiments herein as CRC data, it is not so limited.

An exemplary TCOB DCW specifies that a COB is transported to a device. This exemplary TCOB has a command code that contains a transfer CRC-Offset Block command (e.g., a value of 60 hex). The chain-command flag is one. When the CD Count 208 of the TCOB DCW is not zero, the COB immediately follows the TCOB DCW in the TCA 180 and the CD Count 208 specifies the number of CRC Offsets in the COB multiplied by four. When the CD Count 208 is zero, the COB is specified as TCMI in the output data, the location of the COB is specified by the output-data-address field 146 in the TCW, and the count field specifies the number of CRC offsets in the COB multiplied by four.

As shown in FIG. 14, a COB 222 specifies the location of intermediate CRC words within the transport data for a write or read data transfer (e.g., in a transport-data IU). In one embodiment, a COB is provided when the first DCW 202 in a TCA 180 contains the TCOB command, i.e., is a TCOB DCW. Intermediate CRC offsets are CRC words located between data in a data transfer IU and located before the end of the IU. The COB 222 contains a list of 1-word values, referred to as CRC Offsets 224, each of which identify the byte offset of each intermediate CRC word in the transport data. For example, the COB is a variable-length control block that includes a list of 4-byte entries, each of which identifies the offset of a CRC specified by a TIDAW to be inserted in the output data.

In the embodiment shown in FIG. 14, the COB 222 includes 1 to N+1 words (CRC Offset words 224) of intermediate-CRC offsets. If the COB 222 is provided in a transport-data IU, then the COB may also includes 0 or 1 words of pad bytes and 1 word of CRC. Pad bytes may be provided so that the word containing the CRC will be on a word boundary that is not on a doubleword boundary. The last word of the COB shall contain a CRC that covers intermediate CRC offsets 0 through N and the pad word, if present. If the COB is provided as control data for the TCOB DCW, then there shall be no COB padding or CRC and the control-data count shall be equal to 4 times the number of intermediate-CRC-offset fields in the COB.

For write operations, the TCOB DCW specifies that a COB is transported to a device 116. The TCOB DCW command code includes the TCOB command which is a value of, e.g., 60 hex. The location of the COB is determined by the control-data count and may be provided in either the first write transport-data IU of an I/O operation or as control data following the TCOB DCW of an I/O operation. For example, when the CD count of the TCOB DCW is not zero, the COB 222 immediately follows the TCOB DCW in the TCA 180 and the CD count specifies the number of CRC offsets in the COB multiplied by 4. When the CD count is zero, the COB 222 is specified as TCMI that is transferred with the output data, and the location of the COB is specified by the output-data-address field 144 in the TCW 140.

Each intermediate-CRC offset 224 in the COB 222 indicates the relative offset, in bytes, from the first byte of data in a transport-data IU. If the COB 222 is provided in a transport-data IU, the first byte of data for the write transfer is either the first byte following the COB CRC if a TCAX 220 is not being provided or the first byte following the TCAX CRC if a TCAX is being provided. If the COB is provided in the TCA 180 as DCW control data, the first byte of data for the write transfer is either the first byte in the transport-data IU if a TCAX 220 is not being provided or the first byte following the TCAX CRC if a TCAX 220 is being provided. When provided in a transport-data IU, the COB is provided in the first write transport-data IU of an I/O operation.

Yet another type of transport-command DCW is an interrogate DCW that is used to determine the state of a TCW I/O operation at a device 116. The interrogate command does not initiate an operation at the device 116, does not affect the state of the device 116 and does not reset allegiances associated with the device 116 and an associated logical path. An exemplary interrogate DCW includes an interrogate command code (e.g., contains a value of 40 hex). With the exceptions of the command code, SLI flag, count and CD-count fields, all other fields in the DCW should contain zeros, otherwise a device-detected program-check condition. If the CD count of the interrogate DCW is greater than zero, interrogate data is specified.

An interrogate operation is performed on a logical path and device 116 that has a TCW I/O operation in progress in order to obtain information regarding the state of the operation at the device 116. In one embodiment, the TCCB 170 for an interrogate operation includes a single DCW with an interrogate device command code (e.g., X'40). The TCAH 178 for an interrogate operation may contain the R bit set to one to specify a read data transfer for the operation. An interrogate operation is recognized at the control unit 118 when the control unit 118 accepts a transport-command IU that specifies the interrogate command. When an interrogate operation has been recognized at the control unit 118 and the control unit 118 is able to successfully perform the interrogate command, the control unit 118 may provide status in a transport-response IU that includes interrogate extended status describing the state of the logical path and device address specified by the interrogate transport-command IU.

Referring to FIG. 15, an embodiment of a method of performing a transport mode I/O operation 300 is shown. The method includes one or more stages 301-305. In one embodiment, the method includes the execution of all of the stages 301-305 in the order described. However, certain stages may be omitted, stages may be added, or the order of the stages changed.

In stage 301, the host computer (e.g., the OS 110) executes an instruction (e.g., START SUBCHANNEL) that causes an ORB to be transferred to a channel subsystem 114, that specifies a TCW 140. In one embodiment, program-check conditions related to the validity of TCW fields specific to capturing status and transporting a specified TCCB 170 are checked by the channel subsystem 114 to determine whether to transport the TCCB 170 to an I/O device 116. If such a program-check condition exists, the TCCB 170 is not transported and the program-check condition is recognized. For example, the TCCB-address field 148 is checked that it designates an available storage location. If the TCCB-TIDA flag is one, the TCCB-address field 148 is also checked that it designates an address that is on a quadword boundary. In another example, a program check condition is recognized if the sum of the amount of output data to be transferred (e.g., data for each DCW in the TCA and/or TCAX, plus the size of the reserved areas in any TCMI data blocks and any TIDW-specified CBC and padding bytes) does not equal the value in the TCW Output Count field 158. Additional program check conditions are further described below.

In stage 302, a TCW I/O operation is initiated with an I/O device (via, for example, a control unit 118) when a channel 128 transfers a transport-command IU 172 that includes a control block, such as a transport-command-control block (TCCB) 170 and associated control information for a TCW 140 to a selected device 116. In one embodiment, information associated with the execution of an I/O operation and the operation of a device (e.g., commands, input data and output data) is transferred between the channel 128 and the control unit 118 as Information Units (IUs). In one embodiment, the IUs are in the form of SB-4 Information Units (IUs).

In one embodiment, IUs or other messages are sent between the channel and the control unit via one or more exchanges. An exchange pair consisting of two unidirectional exchanges, one used by a channel 128 to send IUs and one used by a control unit 118 to send IUs, are required for all SB-4 link-control functions and for all SB-4 device-level functions that are executed in command mode. A single bi-directional exchange, referred to as a transport exchange, is used for device-level functions executed in transport mode. IUs that a channel 128 sends during the execution of an SB-4 link-control function or the execution of an SB-4 device-level function in command mode are restricted to one exchange, and IUs which a channel receives during the operation are restricted to a different exchange. The exchange on which the channel 128 sends IUs is referred to as the outbound exchange, and the exchange on which the channel 128 receives IUs is referred to as an inbound exchange. When both an outbound exchange and an inbound exchange simultaneously exist between a channel 128 and a control unit 118 for the execution of the same link-level or device-level function, an exchange pair is said to exist, and the control unit 118 is said to be connected to the channel 128. A channel program which is executed in a single connection uses only one exchange pair. If the connection is removed by the closing of the exchanges during the channel program, a new exchange pair is generated to complete the channel program. A channel 128 can initiate an exchange pair by sending an IU which opens a new exchange (or, an initiation IU) as an unsolicited command or unsolicited control information category. A control unit 118 can initiate an exchange pair by sending an initiation IU as an unsolicited control or unsolicited data information category.

UIs, which a channel and control unit send during the execution of an I/O operation that is performed in transport mode are restricted to a single, bi-directional exchange referred to as a transport exchange. A channel 128 opens a transport exchange by sending a transport-command IU as an unsolicited command category (an Initiation IU). A channel 128 may open multiple transport exchanges, each for a different device 116 or for the same device 116 on different logical paths. A new transport exchange may be opened for a specific device on a logical path when a transport exchange already exists for that device and logical path to perform an interrogate operation; otherwise, the channel 128 waits for the existing transport exchange or exchange pair to be closed before initiating a new transport exchange for the device on the logical path.

In stage 303, the control unit 118 receives the TCCB 170 and transport-command IU 172, and may accept the TCCB 170 if certain conditions are met. When a transport-command IU 172 is accepted, the TCCB 170 is considered current at the control unit 118 until execution of the TCCB 170 at the control unit 118 is considered completed. If the transport-command IU 172 is not accepted because of an error condition, a transport-response IU is returned to the channel 128 with an initial status flag set to one to indicate that the error occurred prior to initiating execution of the TCCB 170 at the device 116. The control unit 118 may provide error information in status and I/O extended status fields in the transport-response IU (described below) to identify the transport-command IU error. In one embodiment, the exemplary conditions described below should be satisfied in order for the transport-command IU 172 to be accepted at the control unit 118:

1) The transport-command IU satisfies the following integrity checks:

a) For control units that do not support bidirectional operations, the L1 field in the TCH plus 8 shall specify an amount of data that is equal to the amount of data received by the control unit for the transport-command IU, otherwise, a transport-command IU integrity error due to a data count error shall be recognized;

b) For control units that support bidirectional operations, the L1 field in the TCH plus either 8 or 9 shall specify an amount of data that is equal to the amount of data received by the control unit for the transport-command IU, otherwise, a transport-command IU integrity error due to a data count error shall be recognized; and c) The LRC field in the TCCB shall be valid, otherwise a transport-command IU integrity error due to invalid LRC error shall be recognized.

2) The specified logical path shall be established, otherwise a logical-path-not-established error shall be recognized;

3) For those commands that require the device to be installed and ready, the device address shall specify a device that is installed and ready, otherwise an address-exception condition shall be recognized;

4) The R and W bits shall not both be set to one in the TCH if bidirectional data transfer is not supported by the control unit or the transport-command IU does not contain the BRDL field; otherwise a TCH content error shall be recognized;

5) The TCCB in the transport-command IU shall satisfy all of the following conditions, otherwise, a TCCB content error shall be recognized:

a) The L2 field shall specify a length that is exactly 8 bytes greater than the L1 field and contain a value that is at least 20 bytes and not more than 252 bytes;

b) Byte 1 of word 0 of the TCAH shall be zero;

c) The format control field in the TCAH shall be equal to hex'7F';

d) The service-action code in the TCAH shall contain a valid value (see 8.13.4.4);

e) If the R and W bits are both set to zero, the data-length (DL) field shall be zero; and 6) If another TCW I/O operation is in progress for the logical path and device address specified in the transport-command IU, the service-action code shall specify hex'1FFF' and the command code in the first DCW of the TCA shall specify the interrogate command code, otherwise a non-interrogate-second-operation error shall be recognized.

In one embodiment, the channel 128 considers a connection to exist when the transport-command IU 172 is sent, and the control unit 118 considers a connection to exist when the transport-command IU 172 is accepted. The channel 128 is thus not aware of whether the control unit 118 has accepted the TCCB 170 or of the progress of the I/O operation at the device 116 until the I/O operation is terminated by the control unit 118 with a transport-response IU. In one embodiment, the channel 128 can set a time window for which to receive a response from the control unit, so that if the channel does not receive a transport-response IU within the window, the channel recognizes a transport command timeout.

In stage 304, when the TCCB 170 has been accepted, the control unit 118 processes the TCA 180 and executes each DCW 202. The DCW 202 being executed is recognized as the current DCW. A DCW 202 becomes current when it is the first DCW of a transport mode program (i.e., the first DCW in a TCCB) and has been selected by the I/O device 116 for execution or when, during command chaining, a subsequent DCW 202 takes over control of the I/O operation. The first DCW to be executed may be considered to be located at offset zero of the TCA 180 in the TCCB 170. Each additional DCW in the channel program is located in the TCA 180 (or in a TCAX 220) and is used when the DCW is needed by the I/O device 116.

Command chaining is controlled by the DCW chain command (CC) flag in the DCW. This flag specifies the action to be taken upon the exhaustion of the current DCW. Chaining takes place between successive DCWs within the TCA. When a TCAX is specified, chaining also takes place between the last DCW in the TCA and the first DCW in the TCAX, and between successive DCWs within the TCAX. When the current DCW specifies command chaining and no unusual conditions have been detected during the operation, the completion of the current DCW causes the next DCW to become the current DCW and be executed by the device. If a TCAX is specified and the offset of the next DCW is past the end of the TCA, chaining continues with the first DCW of the TCAX whose TCAX offset is determined by subtracting the TCA length from the calculated offset. Thus, command chaining proceeds in ascending order of TCA offsets, and then TCAX offsets when a TCAX is specified. If a condition such as attention, unit check, unit exception, or incorrect length has occurred (unless a SLI field 214 in the DCW is activated), the sequence of operations is concluded, and the status associated with the current operation causes an interruption condition to be generated. The new DCW in this case is not executed.

Data that is requested to be transferred via the I/O operation are sent between the channel 128 and control unit 118 via one or more transport-data IUs during processing of the DCWs 202 in a TCCB 170. A read operation performs only a read data transfer, a write operation performs only a write data transfer and a bi-directional operation may perform both a read and write data transfer.

Figure 16:
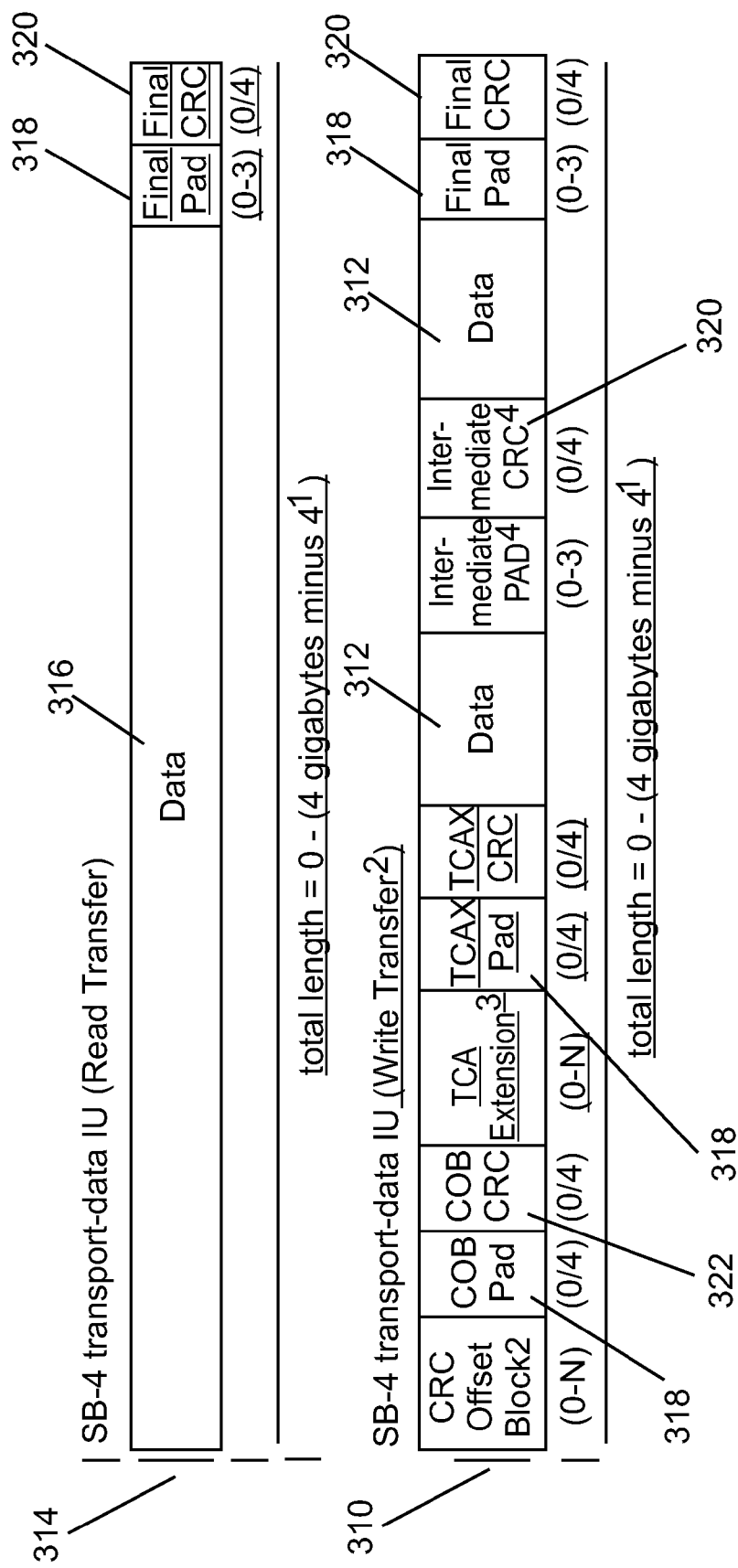
FIG. 16 depicts embodiments of transport-data IUs used to transport input and output data between a channel and a control unit and/or I/O device.

Referring to FIG. 16, for a write or bidirectional operation, the channel 128 sends one or more transport-data IUs 310 to the control unit 118 to transfer write data 312 for the operation. For a read or bidirectional operation, the control unit 118 sends at least one transport-data IU 314 to the channel 128 to transfer read data 316 specified for the operation. Pad bytes 318 may be included in the last word of a data area for which CRC is to be calculated and are used to pad the data area to the next word boundary when the data area to be covered is not an integral number of data words. This applies to data areas to be covered by COB, intermediate and final CRC. The value used for a pad byte is model dependent.

A final CRC field 320 is included in a transport-data IU 310, 314 when the transport-data IU is the last transport-data IU sent by the channel 128 or control unit 118 for a TCW I/O operation. In one embodiment, the final-CRC field 320 includes a word-aligned 32-bit redundancy-check code. For read or write operations, the DL field in the TCCB 170 specifies the amount of data to be transferred during an operation, which may includes all required pad and CRC bytes. For bidirectional operations, the DL field in the TCCB 170 specifies the amount of data to be transferred for the write data transfer portion of the operation and the BRDL field specifies the amount of data to be transferred for the read data transfer portion of the operation. These amounts may include all required pad and CRC bytes.

During a write data transfer, data is transferred in one or more transport-data IUs 310 to the control unit 118 on the transport exchange associated with the TCW I/O operation. In one embodiment, except for the first write transport-data IU 310 of an operation, the channel 128 requires a transfer-ready IU from the control unit 118 prior to sending each transport-data IU 310. The control unit 118 may request additional data by sending additional transfer-ready IUs until it has requested all the data specified by the DL field 186 of the TCCB 170 for the write operation. For a write operation, the next IU sent by the control unit 118 following completion of the data transfer specified by the DL field in the TCCB is a transport-response IU. For a bidirectional operation, the next IU sent by the control unit 118 following completion of the data transfer specified by the DL field in the TCCB may be a transport data IU or a transport-response IU.

During a read data transfer, data is transferred in one or more transport-data IUs 314 to the channel 128 on the transport exchange associated with the TCW I/O operation. The amount of data sent in each transport-data IU is determined by the control unit 118 and may be set to any value as long that the total amount of data transferred in all transport-data IUs 314 for the operation does not exceed the value in the DL field 186 or, for bidirectional operations, the value in the BRDL field 188. For read operations, if the quantity of data sent by the control unit is less than the DL field in the TCCB, the DL residual count in the transport-response IU shall be the difference between the quantity of data sent by the CU and the DL field in the TCCB. The channel recognizes a device-level protocol error if the residual count provided by the control unit in the transport-response IU does not match the difference between the DL and the number of bytes actually received by the channel. For bidirectional operations, if the quantity of data sent by the control unit is less than the BRDL field in the TCCB, the BRDL-residual count in the transport-response IU shall be the difference between the quantity of data sent by the CU and the BRDL field in the TCCB. The channel recognizes a device-level protocol error if the residual count provided by the control unit in the transport-response IU does not match the difference between the BRDL and the number of bytes actually received by the channel.

As shown in FIG. 16, one or more intermediate CRC words 320 may be present in a transport-data IU 310 sent by the channel 128. The intermediate CRC 320 words provide CRC checking of data areas prior to transmission of the entire data area specified by the TCA 180. A COB CRC word 322 may be present in a transport-data IU 310 when a COB 222 is being transferred in the transport-data IU.

Referring again to FIG. 15, in stage 305, the TCW I/O operation is ended by either the channel 128 or the control unit 118. The channel 128 may initiate the ending of a TCW I/O operation as the result of an abnormal condition or a program-initiated termination. The control unit 128 may initiate the ending of the operation as the result of the completion of the execution of the operation or as the result of an abnormal condition detected during the execution of the command. The control unit 128 may initiate the end of a TCW I/O operation by sending a transport-response IU or, in the case of certain errors, by aborting the exchange. In one embodiment, the control unit 118 may initiate the ending of a TCW I/O operation under any of the following circumstances: all of the DCWs 202 in the TCA 180 (and a TCAX if specified) having been executed; an incorrect-length condition having been detected for a DCW when the DCW-incorrect length facility is supported and the SLI flag 214 is set to zero; a unit check condition has been detected; an abnormal condition such as a transport error; or another error was recognized that required the exchange to be aborted.

Referring to FIG. 17, in one embodiment, when an I/O operation or sequence of I/O operations initiated by the execution of START SUBCHANNEL is ended, the channel subsystem and the device generate status conditions. The generation of these conditions can be brought to the attention of the program by means of an I/O interruption or by means of the execution of a TEST PENDING INTERRUPTION instruction. The status conditions, as well as an address and a count indicating the extent of the operation sequence, are presented to the program in the form of a subchannel-status word (SCSW) 400. The SCSW 400 is stored in an interruption-response block (IRB) 402 during the execution of a TEST SUBCHANNEL instruction. When a transport-mode IRB is stored, additional information describing the status of the operation is also stored in the transport-status block.

Normally an I/O operation is being performed until the device signals primary interruption status. Primary interruption status can be signaled during initiation of an I/O operation, or later. An I/O operation can be terminated by the channel subsystem performing a clear or halt function when it detects an equipment malfunction, a program check, a chaining check, a protection check, or an incorrect-length condition, or by performing a clear, halt, or channel-path-reset function as a result of the execution of CLEAR SUBCHANNEL, HALT SUBCHANNEL, or RESET CHANNEL PATH instructions, respectively. I/O interruptions provide a means for the CPU to change its state in response to conditions that occur at I/O devices or subchannels. These conditions can be caused by the program, by the channel subsystem, or by an external event at the device.

The conditions causing requests for I/O interruptions to be initiated are called I/O-interruption conditions. When an interruption condition is recognized by the channel subsystem, it is indicated at the appropriate subchannel. The subchannel is then said to be status pending. The subchannel becoming status pending causes the channel subsystem to generate an I/O interruption request. An I/O-interruption request remains pending until it is accepted by a CPU in the configuration, is withdrawn by the channel subsystem, or is cleared by means of the execution of a TEST PENDING INTERRUPTION, TEST SUBCHANNEL, or CLEAR SUBCHANNEL instruction, or by means of subsystem reset. When a CPU accepts an interruption request and stores the associated interruption code, the interruption request is cleared. When the pending interruption is cleared by the execution of TEST PENDING INTERRUPTION, the subchannel remains status pending until the associated interruption condition is cleared when TEST SUBCHANNEL or CLEAR SUBCHANNEL is executed or when the subchannel is reset.

An I/O-interruption condition is normally cleared by means of the execution of a TEST SUBCHANNEL instruction. If TEST SUBCHANNEL is executed, designating a subchannel that has an I/O-interruption request pending, both the interruption request and the interruption condition at the subchannel are cleared. The interruption request and the interruption condition can also be cleared by CLEAR SUBCHANNEL. A device-end status condition generated by the I/O device and presented following the conclusion of the last I/O operation of a start function is reset at the subchannel by the channel subsystem without generating an I/O-interruption condition or I/O-interruption request if the subchannel is currently start pending and if the status contains device end either alone or accompanied by control unit end. If any other status bits accompany the device-end status bit, then the channel subsystem generates an I/O-interruption request with deferred condition code 1 indicated. When an I/O operation is terminated because of an unusual condition detected by the channel subsystem during the command-initiation sequence, status describing the interruption condition is placed at the subchannel, causing it to become status pending. If the unusual condition is detected by the device, the device-status field of the associated SCSW identifies the condition. When command chaining takes place, the generation of status by the device does not cause an interruption, and the status is not made available to the program.

When the channel subsystem detects any of the following interruption conditions, it initiates a request for an I/O interruption without necessarily communicating with, or having received the status byte from, the device:

1) A programming error associated with the contents of the ORB passed to the subchannel by the previous execution of START SUBCHANNEL;

2) A suspend flag set to one in the first CCW fetched that initiates a CCW channel program execution for either START SUBCHANNEL or RESUME SUBCHANNEL, and suppress suspended interruption not specified in the command-mode ORB; or 3) A programming error associated with the first CCW, TCW, TIDAW, TCCB fetch, data fetch, IDAW, or MIDAW. These interruption conditions from the subchannel, except for the suspended condition, can be accompanied by other subchannel-status indications, but the device-status indications are all stored as zeros.

The channel subsystem issues the clear signal to the device when status containing unit check is presented to a subchannel that is disabled or when the device is not associated with any subchannel. However, if the presented status does not contain unit check, the status is accepted by the channel subsystem and discarded without causing the subchannel to become status pending.

The subchannel-status word (SCSW) 400 provides to the program indications describing the status of a subchannel and its associated device. When a transport mode IRB 402 is stored, additional information describing the status of the operation and the associated device may also be stored in the transport-status block associated with the operation. If performance of a halt, resume, or start function has occurred, the SCSW may describe the conditions under which the operation was concluded.

In one embodiment, the SCSW is stored when TEST SUBCHANNEL is executed and the designated subchannel is operational. The SCSW is placed in words 0-2 of the IRB that is designated as the TEST SUBCHANNEL operand. When STORE SUBCHANNEL is executed, the SCSW is stored in words 7-9 of a subchannel-information block.

The SCSW includes various fields, such as a Deferred Condition Code (CC). The deferred condition code, if not zero, is used to indicate whether conditions have been encountered that preclude the subchannel becoming subchanneland-device active while the subchannel is either start pending or suspended. In one embodiment, when deferred condition code 1 is set, the secondary-status bit is one, and the primary-status bit is zero, the status present may be related to a command-mode channel program specified by the START SUBCHANNEL instruction (or implied by the RESUME SUBCHANNEL instruction) that preceded the most recently executed START SUBCHANNEL and that most recently executed START SUBCHANNEL specified a transport-mode channel program. For such a case, status modifier may also be one in the device-status field.

A Subchannel-Status Field is included in the SCSW 400 and is used to indicate aubchannel-status conditions by the channel subsystem. For example, the subchannel-status field is contained in bit positions 8-15 of word 2 of the SCSW. Subchannel-status conditions are detected and indicated in the SCSW by the channel subsystem. Except for the conditions caused by equipment malfunctioning, they can occur only while the channel subsystem is involved with the performance of a halt or start function. The subchannel-status field is meaningful whenever the subchannel is status pending with any combination of primary, secondary, intermediate, or alert status. When the subchannel is status pending with deferred condition code 3 indicated, the contents of the subchannel-status field are not meaningful.

An exemplary subchannel status condition is an Incorrect length condition, which occurs when the number of bytes contained in the storage areas assigned for the I/O operation is not equal to the number of bytes requested or offered by the I/O device. When the FCX-incorrect-length-indication facility is not installed and an incorrect-length condition is detected, the processing of the transport-mode channel program is terminated with program-check status. When the FCX-incorrect-length-indication facility is installed, the device supports incorrect-length indication, incorrect-length-indication is not being suppressed, and an incorrect-length condition is detected, incorrect length is indicated for one of the following reasons:

1) Long Block on Input: During a read or sense operation, the device attempted to transfer one or more bytes to main storage after the assigned main storage areas were filled, or the device indicated that more data could have been transferred if the count had been larger. The extra bytes have not been placed in main storage. The count in the TSB header (TSH) is zero.

2) Long Block on Output: During a write operation, the device requested one or more bytes from the channel subsystem after the assigned main-storage areas were exhausted, or the device indicated that more data could have been transferred if the count had been larger. The count in the TSH is zero.

3) Short Block on Input: The number of bytes transferred during a read or sense operation is insufficient to fill the main-storage areas assigned to the operation. The count in the TSH is not zero.

4) Short Block on Output: The device terminated a write before all of the information contained in the assigned main-storage areas was transferred to the device. The count in the TSH is not zero.

The incorrect-length indication is suppressed when the current DCW has the SLI flag set to one. The incorrect-length indication is not meaningful when the count field of the TSH is not meaningful. Presence of the incorrect-length condition suppresses command chaining unless the SLI flag in the DCW is one.

The subchannel-extended-status field is included in the SCSW 400 (e.g., in bit positions 24-31 of word 2 of the SCSW). This field may contain information used to further qualify the reason for any the following conditions, when indicated in the subchannel-status: interface-control check, channel-control check, channel-data check, program check, and protection check. If none of these bits are active in the subchannel-status byte, the fields of the subchannel-extended-status contain no meaningful information. When more than one condition is indicated, the interface-control check takes priority over the other conditions.

The subchannel-extended-status field may also include an Interrogate Failed (F) (e.g., at bit 24) operation bit. When set to one, the F bit indicates that an interrogate operation failed because of a program check, channel-control check, or interface-control check.

The subchannel-extended-status field may also include a Subchannel-Extended-Status Qualifier (SESQ) (e.g., bits 25-31). When the subchannel-status field indicates program check, interface-control check, channel-subsystem retry failed, protection check, data check, or channel-control check, this field may contain additional information. Exemplary SESQ values and their associated meanings are shown in FIGS. 18A-18B.

Figure 19:
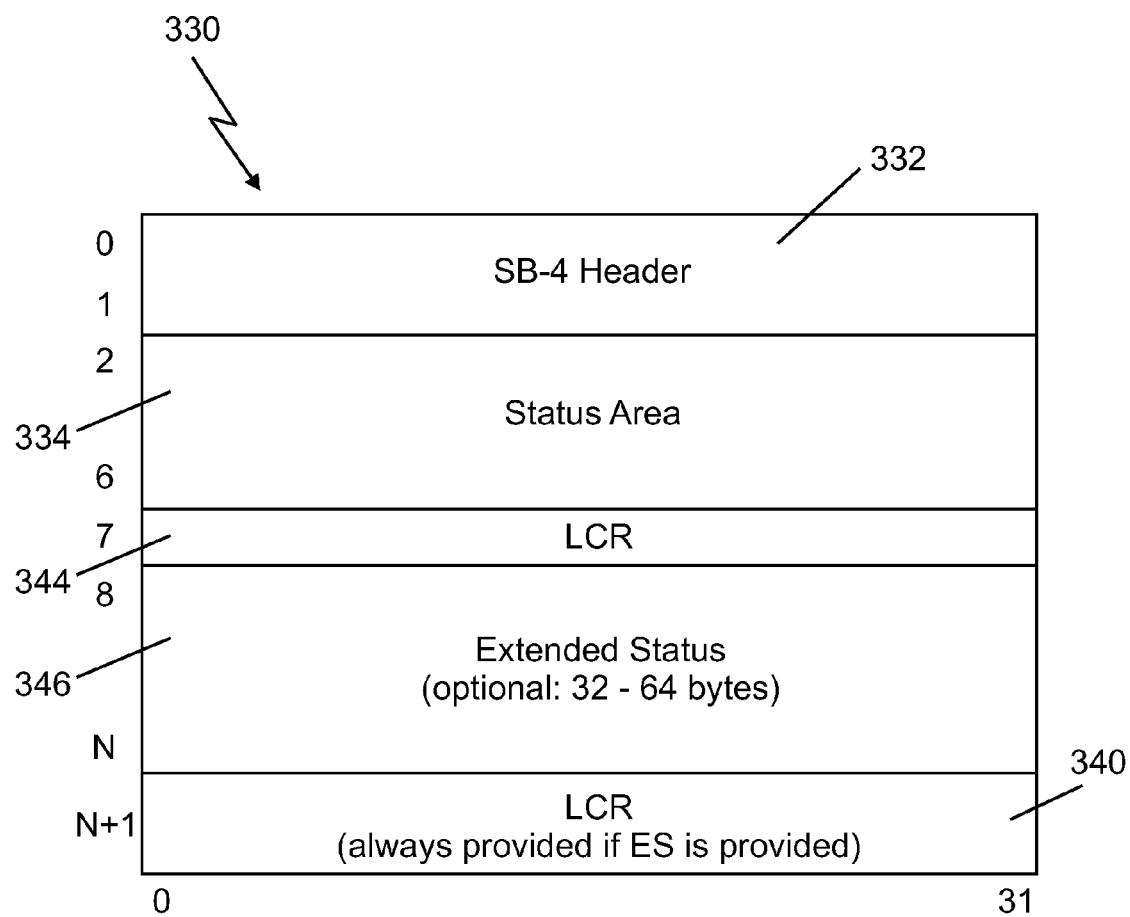
FIG. 19 depicts one embodiment of a transport response IU.

FIGS. 19-20 illustrate an exemplary transport response IU 330 that may be sent by a control unit 118. The Transport Response IU 330 provides status for a TCW I/O operation, which may include a normal ending status or, when an abnormal condition has been detected, termination status that indicates the cause for abnormal termination of the operation. The transport response IU 330 may also include an extended status field that provides further status for the operation. A transport-response IU may or may not close a transport exchange. In one embodiment, whether or not the exchange has been closed by a transport-response IU is indicated in the FC-FS-3 header. If the transport exchange has not been closed by the transport-response IU, the channel may send a transport-confirm IU that closes the exchange after receiving the transport-response IU.

In one embodiment, the transport-response IU 330 includes a SB-4 header 332 followed by a status field 334, a status LRC 344, and an optional extended-status field 346 containing from, e.g., 32 to 64 bytes. When extended status is provided, a 4-byte extended-status LRC field 340 may be provided as the last word of the transport-response IU 330. Pad bytes are added to the extended status to round to the next word boundary if the number of extended-status bytes is not on a word boundary. The SB-4 header 332 has a format similar to that of the transport command IU and is set equal to the SB-4 header in the transport command IU for this exchange.

Referring to FIG. 20, an embodiment of the status area 334 is, e.g., 20 bytes and contains information about the TCW I/O operation. A "status flags 1" field 336 includes one or more exception codes that are set by the control unit 118 to report an abnormal condition detected during a TCW I/O operation. Exemplary codes include:

0—Device-level exception due to an address-exception condition;

2—Link-level reject due to a logical-path-not-established condition;

3—Resetting event notification—a resetting event has occurred on the logical path and the device associated with the transport-command IU. When this code is set in the transport-response IU, the control unit requests status confirmation for the status. If status confirmation is received, the resetting event condition is reset at the device for the logical path; otherwise, the resetting-event condition remains pending;

4—Device-detected program check/IFCC—the control unit has detected a condition that may result in a program check or IFCC to be reported. Errors that fall into this category include errors that indicate the transport-command IU arrived in a corrupted state (e.g., TCCB integrity error), invalid CRC detected for write data, and receipt of a second I/O operation for a logical path and device address that is not an interrogate operation.

5—Device-detected program check—the control unit has detected an error in the content of the TCH In one embodiment, the status flags 1 field 336 includes an Incorrect Length (IL) flag 338. When the DCW-incorrect-length facility is supported by the channel and control unit, bit 0 is the IL flag and, when set to one, shall indicate that the TCW I/O operation was terminated due to an incorrect-length condition for the DCW indicated by the DCW offset. An incorrect length is detected by the control unit 118 if the DCW data count does not match the amount of data required by the device for a write DCW or if the DCW data count does not match the amount of data available at the device for a read DCW.

In one embodiment, if the DCW 202 includes an SLI flag 214, the IL flag 338 is set to one only when the SLI flag 214 is zero and when the device status includes channel-end status without unit-check status. When the IL flag 338 is set to one in a transport-response IU, the DCW offset identifies the DCW containing the incorrect-length condition and the DCW residual count indicates the amount of data transfer, if any, that was transferred for the incorrect-length DCW. Data transfer, if any, for DCWs that preceded the incorrect-length DCW in the TCA shall have completed and all CRC checking on transferred data shall have been performed as described below.

When the DCW containing the incorrect-length condition is a read DCW, the last transport-data IU sent to the channel INCLUDES CRC for all read data transferred to the channel during the TCW I/O operation. If write DCWs preceded the incorrect-length read DCW in the TCA, the data for those write DCWs shall have been received by the control unit and CRC checking shall have been performed on the data. Data for write DCWs in the TCA that follow the incorrect-length read DCW shall be transferred to the control unit as necessary to obtain the CRC for the write data and to perform the CRC checking.

The incorrect-length condition is not recognized by an interrogate command, a transfer-CRC-offset command or a TTE command regardless of whether the incorrect length facility is supported by the channel and the control unit.

The transport response IU 330 may also include a Data Length Residual Count (DLRC) field 340. For write and bidirectional operations, the DL-residual count is a 32-bit, unsigned binary integer that specifies the difference between the DL field in the transport-command IU and the number of bytes actually received from the channel. For read operations, the DL-residual count is a 32-bit, unsigned binary integer that specifies the difference between the DL field in the transport-command IU and the number of bytes actually sent to the channel.

For bidirectional operations, a BRDL residual count field 342 may also be included in the transport-response IU 330. For bidirectional operations, the BRDL-residual count is a 32-bit, unsigned binary integer that specifies the difference between the BRDL field in the transport-command IU and the number of bytes actually sent to the channel.

A Status Flags3 field 344 can be used by the control unit 118 to provide additional information about the associated transport-mode operation. This field may include an Extended Status Sent (ESS) bit to indicate that extended status, including possible sense data, has been sent in the transport-response IU. The extended status includes extended status (ES) Flags that include fields such as an ES Type Code field. Type codes include I/O status (the extended-status area contains valid ending status for the transport-mode I/O operation), I/O Exception (the extended-status area contains information regarding termination of the transport-mode I/O operation due to an exception condition), and Interrogate status (the extended-status area contains status for an interrogate operation).

When the ES-type code in the ES Flags is an I/O exception, the ES includes reason codes (RC). Exemplary reason codes include:

1—TCCB integrity error: the control unit has determined that the TCCB arrived in a corrupted state (provided when exception code 4 is indicated in the status flags 1 field);
2—Invalid CRC detected: invalid CRC was detected on received data (provided when exception code 4 is indicated in the status flags 1 field);
3—Incorrect TCCB length specification (provided when exception code 5 is indicated in the status flags 1 field);
4—TCAH specification error (provided when exception code 5 is indicated in the status flags 1 field);
5—DCW specification error: there is an error with the DCW designated by the DCW-offset field in the extended status (provided when exception code 5 is indicated in the status flags 1 field);
6—Transfer-direction specification error: the command specified by the DCW designated by the DCW-offset field in the extended status specifies a direction of data transfer that disagrees with the transfer direction specified in the TCH or both the R and W bits are set to one in the TCH and bidirectional data transfer is not supported by the control unit (provided when exception code 5 is indicated in the status flags 1 field);
7—Transport-count specification error (provided when exception code 5 is indicated in the status flags 1 field);
8—Two I/O operations active: While an I/O operation is active at the device a second non-interrogate TCCB has been transported to the device for execution. The RCQ field has no meaning. This reason code is provided when exception code 4 is indicated in the status flags 1 field; and
9—One or more entries in the CRC-offset block indicate that an intermediate CRC is not at a location that is appropriate for the device and/or command being executed provided when exception code 4 is indicated in the status flags 1 field.

The Extended Status may also provide a Reason Code Qualifier (RCQ) that provides additional information about the reason(s) for the I/O exception. Different reason code qualifier types may be used for different types of errors, such as TCCB integrity errors, Output Data CRC Errors, Incorrect TCCB Length Specifications, TCAH Specification Errors and DCW Specification Errors. Exemplary RCQs for a TCCB integrity error include:
0—No additional information;
1—Data Count Error—the amount of data transferred for the transport-command IU is not equivalent to the amount of data specified by the L1 field plus 8 in the TCH for control units that do not support bidirectional operations or is not equivalent to the amount specified by the L1 field plus either 8 or 9 for control units that do support bidirectional operations; and
2 LRC error—the LRC on the transport-command IU is invalid.

Exemplary RCQs for a DCW specification error include:
1—Reserved-field specification error: A reserved field in the DCW that is required to contain zeros contains a non-zero value;
2—Flags-field command-chaining specification error: The command-chaining bit is one and the offset of the next DCW is such that all or part of the next DCW extends past the end of the TCA, or the command-chaining bit is zero and more than 3 unused bytes remain in the TCA;
3—Control-data count specification error: The CD count specifies control data past the end of the TCA;

4—TCOB DCW location error: The first TCOB DCW is not the first DCW in the TCA;
5—TCOB DCW duplication error: More than one TCOB DCW is specified in the TCA;
6—TCOB DCW multiple-count specification error: Both the CD count and the DCW data count are either zero or nonzero;
7—TCOB DCW direction error: A TCOB DCW is specified in the TCA and the W bit in the TCH is zero;
8—TCOB DCW chaining error: The chain-command bit in the TCOB DCW is zero, i.e., the TCOB DCW is the only DCW in the TCA;
9—TCOB count-specification error: A TCOB DCW has a nonzero CD count or a data count that is not a multiple of 4;
10—TTE DCW location error: A TCOB DCW was not specified and a TTE DCW was encountered that was not the first DCW in the TCA or a TCOB DCW was specified and the first TTE DCW encountered was not the second DCW in the TCA;
11—TTE DCW duplication error: More than one TTE DCW was encountered in the TCA;
12—TTE DCW CD-count specification error: The control-data count in the TTE DCW specifies a value that is not zero;
13—TTE DCW data-count specification error: The data count in the TTE DCW specifies a value that is less than 8 or a value that is not a multiple of 4;
14—TTE DCW direction error: A TTE DCW is specified and the W bit in the TCH is zero;
15—TTE DCW chaining error: The chain-command bit in the TTE DCW is zero; and
16—TCAX specification error: A TTE DCW is specified and either of the following is true:
  The length of the TCA is 58 words or less, or
  The length of the TCA is 59 words, the last DCW in the TCA specifies control data and the length of the control data extends beyond 59 words, or
  The length of the TCA is the maximum length of 60 words and the last word in the TCA contains the first word of a DCW.

Exemplary RCQs for a Transfer-Direction Specification Error include:
1—Read-direction specification error: The DCW specifies an input operation and the R bit in the TCH is zero;
2—Write-direction specification error: The DCW specifies an output operation and the W bit in the TCH is zero. Note—A DCW specification is recognized when a TCOB or TTE DCW is specified and the W bit in the TCH is zero;
3—Read-Write conflict: Both the R and W bits in the TCH are one and the control unit does not support bidirectional operations or the control unit supports bidirectional operations but the transport-command IU did not contain the BRDL field, or both the R and W bits are not one and the transport-command IU contains the BRDL field;

Exemplary RCQs for a Transport-Count Specification Error include:
1—Read-count specification error: for read operations, the DL field in the TCCB specifies a value that is not equivalent to the total count of data bytes specified by the DCWs in the TCA plus pad bytes and CRC; for bidirectional operations, the BRDL field in the TCCB specifies a value that is not equivalent to the total count of data bytes specified by the read DCWs in the TCA plus pad bytes and CRC; and
2—Write-count specification error: The DL field in the TCCB specifies a value that is not equivalent to the total count of data bytes specified by the write DCWs in the TCA plus intermediate pad bytes, intermediate CRC, final pad bytes and final CRC bytes, and if a COB is included in the first transport-data IU of the write data transfer, the count includes the COB, any COB pad bytes and the COB CRC bytes. If a TTE DCW is present in the TCA, the count also includes the TCAX and TCAX CRC bytes.

A program check occurs when programming errors are detected by the channel subsystem. For a transport mode operation, programming errors may also be detected by the I/O device 116 and are reported as program checks. A program check condition can be due to any of the following reasons:

Invalid TCW Specification: When any of the following conditions is detected, an invalid TCW specification is recognized:
1. A reserved field that is checked for zeros in the TCW does not contain zeros.
2. A non-zero value is specified in the TCW format field.
3. The read and write bits in the TCW are both one, bit 10 of the TCW flags field is zero, and either the FCX-bidirectional-data-transfer facility is not installed or the specified device does not support bi-directional data transfers.
4. The bit 10 of the TCW flags field is zero and the TCCB-length field in a TCW specifies a length that is less than 12 or greater than 244.
5. Bit 10 of the TCW flags field is one and the write operations (W) bit of the TCW is zero, the read operations (R) bit of the TCW is zero, or both are zero.
6. Bit 10 of the TCW flags field is one and the designated subchannel is not associated with a control unit that has been configured to transport fibre-channel-services requests.

When a TTE DCW is used, a device-detected program check is recognized when any of the following conditions exist:
1. When a TCOB DCW is not specified, the TTE DCW is not the first DCW in the TCA. When a TCOB DCW is specified, the TTE DCW is not the second DCW in the TCA.
2. The TTE DCW is specified and a write operation is not specified (that is, the W-bit in the TCW is zero).
3. The chain-command flag in the TTE DCW is zero.
4. More than one TTE DCW is specified
5. The control-data-count field in the TTE DCW does not contain zero.
6. The count field contains less than 8 or a value that is not a multiple of 4.
7. Any of the following are true for the TCA:
  The TCA does not contain at least one DCW that is not a transport-command DCW.
  The TCA contains one or more DCWs that are not transport-command DCWs and the chain-command flag in the last DCW of the TCA is zero.

When a TTE DCW is used and additional TCMI and/or output data follows the TCAX, the following should be true; otherwise, a device-detected program check may be recognized:
  The output-TIDA flag (flags bit 7) in the TCW must be one; or
  When TIDAWs are used for the transfer of a TCAX and for the transfer of data, the insert-CBC control must be set to one in the last or only TIDAW that is used to transfer the TCAX. When TIDAWs are used for the transfer of only the TCAX, it is not necessary to set the insert-CBC control in the last or only TIDAW.

During the processing of a TCA, a TCCB content error may be recognized when any of the following conditions are detected:
1. The first TCOB DCW encountered is not the first DCW in the TCA;
2. a second TCOB DCW is encountered in the TCA;
3. a TCOB DCW is encountered in the TCA when the W bit in the TCAH is zero;

4. a TCOB DCW does not have the chaining flag set;
5. a TCOB DCW is encountered in which both the CD count and data count are zero;
6. a TCOB DCW is encountered in which both the CD count and data count are non-zero;
7. a TCOB DCW is encountered in which the CD count is zero and the data count is not a multiple of 4;
8. a TCOB DCW is encountered in which the data count is zero and the CD count is not a multiple of 4;
9. A TCOB DCW is not specified and the TTE DCW is not the first DCW in the TCA or a TCOB is specified and the TTE DCW is not the second DCW in the TCA;
10. A TTE DCW is encountered in the TCA when the W bit in the TCAH is zero;
11. A TTE DCW does not have the chaining flag set;
12. A second TTE DCW is encountered in the TCA;
13. A TTE DCW is encountered in which the CD count is non-zero;
14. A TTE DCW is encountered in which the data count is zero or is not a multiple of 4;
15. A TTE DCW is specified and any of the following is true: the length of the TCA is 58 words or less; the length of the TCA is 59 words, the last DCW in the TCA specifies control data and the length of the control data extends beyond 59 words; or the length of the TCA is the maximum length of 60 words and the last word in the TCA contains the first word of a DCW;
16. A DCW contains a command that requires control data and the CD count field is zero or contains a value that specifies data past the end of the TCA;
17. A DCW contains a CD count field that is non-zero and the command does not allow control data to be provided;
18. During a write operation, the device encountered a command in the TCA that attempted to perform a read data transfer;
19. During a read operation, the device encountered a command in the TCA that attempted to perform a write data transfer;
20. The CC bit is zero in a DCW and more than 3 unused bytes remain in the TCA;
21. The CC bit is one in a DCW and next DCW location is determined to be less than 8 bytes from the end of the TCA indicating and a TCAX has not been provided, or a TCAX has been provided and the next DCW location is determined to be less than 8 bytes from the end of the TCAX;
22. For a read or bidirectional operation, when a read DCW in the TCA becomes current, the sum of the data counts for all previous read DCWs and the current DCW plus all pad and CRC bytes exceeds the DL field in the TCCB or, for bidirectional operations, exceeds the BRDL field in the TCCB;
23. For a read or bidirectional operation, when the last DCW in the TCA becomes current, the sum of the data counts for all read DCWs plus all pad and CRC bytes is not equal to the DL field in the TCCB or, for bidirectional operations, is not equal to the BRDL field in the TCCB;
24. For a write or bidirectional operation, when a DCW in the TCA becomes current, the sum of the data counts for all write DCWs plus all pad and CRC bytes (including all intermediate pad and CRC bytes), and if a COB is included in the transport-data IU, the COB, COB pad and COB CRC bytes, and if a TCAX is present, the TCAX, TCAX pad, and TCAX CRC bytes, exceeds the DL field in the TCCB; or
25. For a write operation or bidirectional operation, when the last DCW in the TCA becomes current, the sum of the data counts for all write DCWs plus all pad and CRC bytes (including all intermediate pad and CRC bytes), and if a COB is included in the transport-data IU, the COB, COB pad and COB CRC bytes, and if a TCAX is present, the TCAX, TCAX pad, and TCAX CRC bytes, is not equal to the DL field in the TCCB.

In one embodiment, prior to performing command mode or transport mode operations, links between the channel subsystem 114 and control units 118 and/or devices 116 are established. Each channel 128 in the I/O system that has a physical connection with one or more control units can be referred to as a "N_Port" that has a unique identifier (a "N_Port_ID"). Likewise, each control unit 118 can also be referred to an a N_Port having an associated N_Port_ID. Both a channel 128 and a control unit 118 may include multiple channel images or control unit images, respectively. Each N_Port includes an address identifier that is assigned during initialization and the performance of a login procedure. Explicit N_Port login may be performed by means of the N_Port login (PLOGI) extended link service during the initialization process. When an N_Port has performed N_Port login with another N_Port, that N_Port is said to be logged in with the other N_Port.

In one embodiment, link initialization between the channel subsystem and control units is performed using the process login (PRLI) extended link service (ELS) protocol. General aspects of the PRLI ELS, including the format of the PRLI ELS request and response, are given in FC-LS-2 with specific settings for FC-SB-4 defined in the sections below.

During a PRLI procedure, a channel 128 that supports PRLI sends a request to each control unit 118 in its configuration that also supports the process login ELS to determine whether the control unit 118 supports transport-mode operations. In one embodiment, the PRLI request is sent during channel initialization prior to establishing logical paths and may also be sent as the result of a process logout (PRLO). The PRLI ELS is used to exchange process login service parameters between a channel 128 and control unit 118. Parameters may be exchanged between a channel and control unit via a PRLI request and a PRLI response.

The PRLI request includes a service parameter page, which may include a Type Code field that identifies the FC-4 protocol (e.g., is set to hex'1B' to indicate the SB-4 protocol). A FC-SB-4 Flags (e.g., Byte 3 of word 3 of the PRLI request page) includes one or more flags described below:

0—Transport Mode Supported. When bit 0 is set to zero, the channel does not support transport-mode operations. When bit 0 is set to one, the channel supports transport-mode operations.

1—Reserved.

2—DCW Incorrect Length (IL) Facility Supported. For example, when an IL flag is active (e.g., when bit 2 is set to one), the DCW IL facility is supported by the channel 128. When bit 2 is set to zero, the DCW IL facility is not supported by the channel 128. The DCW IL facility includes support for the suppress-length-indicator (SLI) flag 214 and the incorrect-length flag 338. When the transport mode-supported bit (bit 0) is equal to zero, bit 2 shall be set to zero.

5—Bidirectional Data Transfer Supported. When a bi-directional transfer indication is active (e.g., bit 5 is set to one) bidirectional data transfer is supported by the channel 128. When bit 5 is set to zero, bidirectional data transfer is not supported by the channel. This bit is only meaningful when the transport mode-supported bit is equal to one.

7—First Transfer Ready Disabled Supported. When bit 7 is set to one, first-transfer-ready-disabled operation is supported by the channel. When bit 7 is set to zero, first-transfer-ready disabled operation is not supported by the channel. When the transport-mode-supported bit (bit 0) is equal to zero, bit 7 shall be set to zero.

In one embodiment, the PRLI response includes a PRLI Accept Service Parameter Page, which may include a Type Code field that identifies the FC-4 protocol (e.g., is set to hex'1B' to indicate the SB-4 protocol), and a FC-SB-4 Flags field (e.g., Byte 3 of word 3) that includes one or more flags defined described below:

0—Transport Mode Supported. When bit 0 is set to zero, the control unit 118 does not support transport-mode operations. When bit 0 is set to one, the control unit 118 supports transport-mode operations.

2—DCW Incorrect Length (IL) Facility Supported. When bit 2 is set to one, the DCW-incorrect-length (IL) facility is supported by the control unit 118. When bit 2 is set to zero, the DCW IL facility is not supported by the control unit 118. The DCW-incorrect-length facility includes support for the SLI flag 214 and the incorrect-length flag 338. When the transport-mode-supported bit (bit 0) is equal to zero, bit 2 shall be set to zero.

5—Bidirectional Data Transfer Supported. When a bi-directional data transfer indication is active (e.g., bit 5 is set to one), bidirectional data transfer is supported by the control unit 118. When bit 5 is set to zero, bidirectional data transfer is not supported by the control unit 118. This bit is only meaningful when the transport-mode-supported bit is equal to one.

7—First Transfer Ready Disabled Supported. When bit 7 is set to one, first-transfer-ready-disabled is supported by the control unit. When bit 7 is set to zero, first-transfer-ready-disabled operation is not supported by the control unit. When the transport-mode-supported bit (bit 0) is equal to zero, bit 7 shall be set to zero.

Technical effects and benefits of exemplary embodiments include the ability to transfer transport support data as well as additional commands to the control unit, in addition to I/O commands and device support data located in a TCCB. Technical effects also include the ability to continue processing of DCWs despite detection of an incorrect length condition, which allows a control unit to continue to process I/O commands without the need to terminate an I/O operation. Other technical effects include the ability to transport both input and output data between a channel and a control unit during a single I/O operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A non-transitory computer readable medium comprising executable instructions for performing an input/output (I/O) operation at a control unit configured to control an I/O device and configured for communication with a host computer system, the I/O operation initiated by an I/O operation instruction, the computer readable medium readable by a processing circuit for performing a method comprising:

receiving at least one command message specifying an I/O operation at the control unit from a channel subsystem of the host computer system, the at least one command message including one or more device command words (DCWs), each DCW specifying an I/O command, wherein at least one DCW of the one or more DCWs includes a data count and a suppress-length indication (SLI), the SLI configured to instruct the control unit whether to continue to perform the I/O operation based on the control unit detecting an incorrect length condition, the incorrect length condition detected based on the data count not matching an amount of data required to perform the I/O operation command, wherein the data required is one of data available at the control unit for a read operation command and data required by the control unit for a write operation command;

processing at least one of the one or more DCWs; and returning a transport response message by the control unit to the channel subsystem based on executing or terminating the I/O operation, the transport response message including a status of the I/O operation and an incorrect length (IL) value indicating presence or absence of the incorrect length condition, the IL value being a first IL value based on the SLI being a first SLI value and the data count not matching the amount of data required, the IL value being a second IL value based on the SLI being the first SLI value and the data count matching the amount of data required, the transport response message including at least one residual count field configured to indicate at least one of: i) a difference between the data count and an amount of data received from the channel subsystem and ii) a difference between the data count and an amount of data sent to the channel subsystem.

2. The computer program product of claim 1, wherein the at least one command message includes a TCCB that holds the plurality of DCWs therein, the TCCB specified by a transport command word (TCW) stored in a host system memory.

3. The computer program product of claim 1, wherein the at least one DCW includes a command chaining flag indicating that a subsequent DCW is logically connected to the at least one DCW and is to be performed by the control unit after the control unit executes the at least one DCW.

4. The computer program product of claim 3, wherein the SLI instructs the control unit to continue command chaining and execute the subsequent DCW based on the control unit detecting the incorrect length condition.

5. The computer program product of claim 1, wherein the SLI is a value in an SLI field in the at least one DCW, the value being one instructing the control unit to continue the I/O operation when an incorrect length condition is detected, and the value being zero instructing the control unit to terminate the I/O operation when the incorrect length condition is detected.

6. The computer program product of claim 1, wherein the control unit is configured to detect an incorrect length condition and indicate to the channel subsystem, through the IL value, that the I/O operation was terminated due to an incorrect length condition.

7. The computer program product of claim 5, wherein the SLI field includes a value of one, the at least one DCW is a read DCW, and the computer program product is configured to further perform:

based on a command chaining flag indicating that command chaining is being used for the read DCW and the data count value being greater than an amount of data available at an I/O device, transferring the amount of data by the control unit to the channel subsystem and including one or more pad bytes in the data transfer so that the amount of data transferred for the DCW is equal to the data count value;

based on the command chaining flag indicating that command chaining is not being used for the read DCW and the data count value being greater than the amount of data available at the device, transferring by the control unit only the amount of data or transferring the amount of data with one or more pad bytes so that the amount of data transferred for the DCW is equal to the data count value; and based on the data count value being less than the amount of data available at the device, transferring an amount of data equal to the data count value to the channel subsystem.

8. The computer program product of claim 5, wherein the SLI field includes a value of one, the at least one DCW is a write DCW, and the computer program product is configured to further perform:
  based on a command chaining flag indicating that command chaining is being used for the write DCW and the data count value being greater than an amount of data required by the device, receiving an amount of data from the channel subsystem at the control unit that is equal to the amount of data required by an I/O device;
  based on the command chaining flag indicating that command chaining is not being used for the write DCW and the data count value being greater than the amount of data required by the device, receiving at the control unit the amount of data required by the device and receiving additional data until the data count value is exhausted; and
  based on the data count value being less than the amount of data required by the device, receiving an amount of data equal to the data count value at the control unit.

9. The computer program product of claim 1, wherein the at least one DCW includes the SLI including an SLI field having a value of one based on the SLI being the second SLI value and a value of zero based on the SLI being the first SLI value, and the control unit is configured to return a transport response message to the channel subsystem based on executing or terminating the I/O operation, the transport response message including the IL value in an incorrect length (IL) field that indicates whether the I/O operation was terminated due to the incorrect length condition, the IL field having a value of one based on the SLI being the first SLI value and the data count not matching the amount of data required, the IL field having a value of zero based on at least one of the SLI being the second SLI value and the data count matching the amount of data required.

10. The computer program product of claim 9, wherein the transport response message includes a DCW Offset field that indicates which of the plurality of DCWs caused the incorrect length condition to be detected.

11. The computer program product of claim 1, wherein the control unit is configured to perform:
  receiving a process login (PRLI) request message from the channel subsystem at the control unit, the PRLI request message configured to initialize a link between the channel subsystem and the control unit, the PRLI request message including a header having a value that indicates whether the channel subsystem supports use of the SLI; and
  sending a (PRLI) response message by the control unit to the channel subsystem, the PRLI response message including a header having a value that indicates whether the control unit supports use of the SLI.

12. An apparatus for performing an input/output (I/O) operation at a control unit configured to control an I/O device and configured for communication with a host computer system, the I/O operation initiated by an I/O operation instruction, the control unit configured to perform:
  receiving at least one command message specifying an I/O operation at the control unit from a channel subsystem of the host computer system, the at least one command message including one or more device command words (DCWs), each DCW specifying an I/O command, wherein at least one DCW of the one or more DCWs includes a data count and a suppress-length indication (SLI), the SLI configured to instruct the control unit whether to continue to perform the I/O operation based on the control unit detecting an incorrect length condition, the incorrect length condition detected based on the data count not matching an amount of data required to perform the I/O operation command, wherein the data required is one of data available at the control unit for a read operation command and data required by the control unit for a write operation command;
  processing at least one of the one or more DCWs; and
  returning a transport response message by the control unit to the channel subsystem based on executing or terminating the I/O operation, the transport response message including a status of the I/O operation and an incorrect length (IL) value indicating presence or absence of the incorrect length condition, the IL value being a first IL value based on the SLI being a first SLI value and the data count not matching the amount of data required, the IL value being a second IL value based on the SLI being the first SLI value and the data count matching the amount of data required, the transport response message including at least one residual count field configured to indicate at least one of: i) a difference between the data count and an amount of data received from the channel subsystem and ii) a difference between the data count and an amount of data sent to the channel subsystem.

13. The apparatus of claim 12, wherein the at least one DCW includes a command chaining flag indicating that a subsequent DCW is logically connected to the at least one DCW and is to be performed by the control unit after the control unit executes the at least one DCW.

14. The apparatus of claim 12, wherein the SLI is a value in an SLI field in the at least one DCW, the value being one instructing the control unit to continue the I/O operation when an incorrect length condition is detected, and the value being zero instructing the control unit to terminate the I/O operation when the incorrect length condition is detected.

15. The apparatus of claim 14, wherein the SLI field includes a value of one, the at least one DCW is a read DCW, and the apparatus is configured to perform:
  based on a command chaining flag indicating that command chaining is being used for the read DCW and the data count value being greater than an amount of data available at an I/O device, transferring the amount of data by the control unit to the channel subsystem and including one or more pad bytes in the data transfer so that the amount of data transferred for the DCW is equal to the data count value;
  based on the command chaining flag indicating that command chaining is not being used for the read DCW and the data count value being greater than the amount of data available at the device, transferring by the control unit only the amount of data or transferring the amount of data with one or more pad bytes so that the amount of data transferred for the DCW is equal to the data count value; and
  based on the data count value being less than the amount of data available at the device, transferring an amount of data equal to the data count value to the channel subsystem.

16. The apparatus of claim 14, wherein the SLI field includes a value of one, the at least one DCW is a write DCW, and the apparatus is configured to perform:
  based on a command chaining flag indicating that command chaining is being used for the write DCW and the data count value being greater than an amount of data required by the device, receiving an amount of data from the channel subsystem at the control unit that is equal to the amount of data required by an I/O device;

based on the command chaining flag indicating that command chaining is not being used for the write DCW and the data count value being greater than the amount of data required by the device, receiving at the control unit the amount of data required by the device and receiving additional data until the data count value is exhausted; and based on the data count value being less than the amount of data required by the device, receiving an amount of data equal to the data count value at the control unit.

17. The apparatus of claim 12, wherein the at least one DCW includes the SLI including an SLI field having a value of one based on the SLI being the second SLI value and a value of zero based on the SLI being the first SLI value, and the control unit is configured to return a transport response message to the channel subsystem based on executing or terminating the I/O operation, the transport response message including the IL value in an incorrect length (IL) field that indicates whether the I/O operation was terminated due to the incorrect length condition, the IL field having a value of one based on the SLI being the first SLI value and the data count not matching the amount of data required, the IL field having a value of zero based on at least one of the SLI being the second SLI value and the data count matching the amount of data required.

18. The apparatus of claim 17, wherein the transport response message includes a DCW Offset field that indicates which of the plurality of DCWs caused the incorrect length condition to be detected.

19. The apparatus of claim 12, wherein the control unit is configured to perform:

receiving a process login (PRLI) request message from the channel subsystem at the control unit, the PRLI request message configured to initialize a link between the channel subsystem and the control unit, the PRLI request message including a header having a value that indicates whether the channel subsystem supports use of the SLI; and sending a (PRLI) response message by the control unit to the channel subsystem, the PRLI response message including a header having a value that indicates whether the control unit supports use of the SLI.

20. A method of performing an input/output (I/O) processing operation at a control unit configured to control an I/O device and configured for communication with a host computer system, the I/O operation initiated by an I/O operation instruction, the method comprising:

receiving at least one command message specifying an I/O operation at the control unit from a channel subsystem of the host computer system, the at least one command message including one or more device command words (DCWs), each DCW specifying an I/O command, wherein at least one DCW of the one or more DCWs includes a data count and a suppress-length indication (SLI), the SLI configured to instruct the control unit whether to continue to perform the I/O operation based on the control unit detecting an incorrect length condition, the incorrect length condition detected based on the data count not matching an amount of data required to perform the I/O operation command, wherein the data required is one of data available at the control unit for a read operation command and data required by the control unit for a write operation command;

processing at least one of the one or more DCWs; and returning a transport response message by the control unit to the channel subsystem based on executing or terminating the I/O operation, the transport response message including a status of the I/O operation and an incorrect length (IL) value indicating presence or absence of the incorrect length condition, the IL value being a first IL value based on the SLI being a first SLI value and the data count not matching the amount of data required, the IL value being a second IL value based on the SLI being the first SLI value and the data count matching the amount of data required, the transport response message including at least one residual count field configured to indicate at least one of: i) a difference between the data count and an amount of data received from the channel subsystem and ii) a difference between the data count and an amount of data sent to the channel subsystem.

21. The method of claim 20, wherein the at least one DCW includes a command chaining flag indicating that a subsequent DCW is logically connected to the at least one DCW and is to be performed by the control unit after the control unit executes the at least one DCW.

22. The method of claim 20, wherein the SLI is a value in an SLI field in the at least one DCW, the value being one instructing the control unit to continue the I/O operation when an incorrect length condition is detected, and the value being zero instructing the control unit to terminate the I/O operation when the incorrect length condition is detected.

23. The method of claim 20, wherein the at least one DCW includes the SLI including an SLI field having a value of one based on the SLI being the second SLI value and a value of zero based on the SLI being the first SLI value, and the method further comprises returning the transport response message including the IL value in an incorrect length (IL) field that indicates whether the I/O operation was terminated due to the incorrect length condition, the IL field having a value of one based on the SLI being the first SLI value and the data count not matching the amount of data required, the IL field having a value of zero based on at least one of the SLI being the second SLI value and the data count matching the amount of data required.

24. The method of claim 23, wherein the transport response message includes a DCW Offset field that indicates which of the plurality of DCWs caused the incorrect length condition to be detected.

25. The method of claim 20, further comprising:

receiving a process login (PRLI) request message from the channel subsystem at the control unit, the PRLI request message configured to initialize a link between the channel subsystem and the control unit, the PRLI request message including a header having a value that indicates whether the channel subsystem supports use of the SLI; and sending a (PRLI) response message by the control unit to the channel subsystem, the PRLI response message including a header having a value that indicates whether the control unit supports use of the SLI.

26. The apparatus of claim 12, wherein the control unit is configured to detect an incorrect length condition and indicate to the channel subsystem, through the IL value, that the I/O operation was terminated due to an incorrect length condition.

27. The method of claim 20, further comprising detecting an incorrect length condition and indicating to the channel subsystem, through the IL value, that the I/O operation was terminated due to an incorrect length condition.

* * * * *